(12) United States Patent
Kingsley et al.

(10) Patent No.: US 12,496,119 B2
(45) Date of Patent: Dec. 16, 2025

(54) JAW MEMBER, END EFFECTOR ASSEMBLY, AND METHOD OF MANUFACTURING A JAW MEMBER OF AN ELECTROSURGICAL INSTRUMENT

(71) Applicant: Covidien LP, Mansfield, MA (US)

(72) Inventors: Dylan R. Kingsley, Broomfield, CO (US); Christopher T. Tschudy, Arvada, CO (US); Jason G. Weihe, Longmont, CO (US); Zachary S. Heiliger, Nederland, CO (US); William R. Whitney, Boulder, CO (US); Curtis M. Siebenaller, Frederick, CO (US); Haralambos P. Apostolopoulos, Westminster, CO (US)

(73) Assignee: Covidien LP, Mansfield, MA (US)

( * ) Notice: Subject to any disclaimer, the term of this patent is extended or adjusted under 35 U.S.C. 154(b) by 491 days.

(21) Appl. No.: 18/073,473

(22) Filed: Dec. 1, 2022

(65) Prior Publication Data

US 2023/0172653 A1 Jun. 8, 2023

Related U.S. Application Data

(60) Provisional application No. 63/286,192, filed on Dec. 6, 2021.

(51) Int. Cl.
*A61B 18/12* (2006.01)
*A61B 18/14* (2006.01)
(Continued)

(52) U.S. Cl.
CPC ......... *A61B 18/1445* (2013.01); *B29C 70/84* (2013.01); *A61B 2017/00526* (2013.01);
(Continued)

(58) Field of Classification Search
CPC ........ A61B 18/1445; A61B 2018/0063; A61B 2018/00607; A61B 2018/00083; A61B 2018/00077; A61B 2018/1452
See application file for complete search history.

(56) References Cited

U.S. PATENT DOCUMENTS 5,484,436 A * 1/1996 Eggers ............... A61B 18/1445
606/41
6,010,516 A * 1/2000 Hulka ................ A61B 18/1442
606/51

(Continued)

*Primary Examiner* — Daniel W Fowler

(57) ABSTRACT

A jaw member of a surgical instrument includes a structural frame, an insulative spacer supported on the structural frame, an electrically conductive tissue contacting plate supported on the insulative spacer, and a lead wire. The spacer defines a pocket at an upper portion thereof and includes a channel extending from the pocket, through the spacer, to a bottom portion of the spacer. The channel defines a substantially U-shaped configuration having first and second radiused corners at the bottom portion of the spacer. The lead wire is attached to an underside of the plate at an attachment point within the pocket and extends distally from the attachment point into the channel, through the channel, over the first and second radiused corners, and proximally from the jaw member. The lead wire is adapted to connect to a source of energy to energize the plate for treating tissue.

19 Claims, 12 Drawing Sheets

(51) Int. Cl.
  *B29C 70/84* (2006.01)
  *A61B 17/00* (2006.01)
  *A61B 17/29* (2006.01)
  *A61B 18/00* (2006.01)
  *B29L 31/00* (2006.01)

(52) U.S. Cl.
  CPC ............. *A61B 2017/2947* (2013.01); *A61B 2018/00077* (2013.01); *A61B 2018/00083* (2013.01); *B29L 2031/7546* (2013.01)

(56) References Cited

U.S. PATENT DOCUMENTS

| | | |
|---|---|---|
| 6,132,368 A | 10/2000 | Cooper |
| 6,206,903 B1 | 3/2001 | Ramans |
| 6,246,200 B1 | 6/2001 | Blumenkranz et al. |
| 6,312,435 B1 | 11/2001 | Wallace et al. |
| 6,331,181 B1 | 12/2001 | Tierney et al. |
| 6,394,998 B1 | 5/2002 | Wallace et al. |
| 6,424,885 B1 | 7/2002 | Niemeyer et al. |
| 6,441,577 B2 | 8/2002 | Blumenkranz et al. |
| 6,459,926 B1 | 10/2002 | Nowlin et al. |
| 6,491,691 B1 | 12/2002 | Morley et al. |
| 6,491,701 B2 | 12/2002 | Tierney et al. |
| 6,493,608 B1 | 12/2002 | Niemeyer |
| 6,565,554 B1 | 5/2003 | Niemeyer |
| 6,645,196 B1 | 11/2003 | Nixon et al. |
| 6,659,939 B2 | 12/2003 | Moll |
| 6,671,581 B2 | 12/2003 | Niemeyer et al. |
| 6,676,684 B1 | 1/2004 | Morley et al. |
| 6,685,698 B2 | 2/2004 | Morley et al. |
| 6,699,235 B2 | 3/2004 | Wallace et al. |
| 6,714,839 B2 | 3/2004 | Salisbury, Jr. et al. |
| 6,716,233 B1 | 4/2004 | Whitman |
| 6,728,599 B2 | 4/2004 | Wang et al. |
| 6,746,443 B1 | 6/2004 | Morley et al. |
| 6,766,204 B2 | 7/2004 | Niemeyer et al. |
| 6,770,081 B1 | 8/2004 | Cooper et al. |
| 6,772,053 B2 | 8/2004 | Niemeyer |
| 6,783,524 B2 | 8/2004 | Anderson et al. |
| 6,793,652 B1 | 9/2004 | Whitman et al. |
| 6,793,653 B2 | 9/2004 | Sanchez et al. |
| 6,799,065 B1 | 9/2004 | Niemeyer |
| 6,837,883 B2 | 1/2005 | Moll et al. |
| 6,839,612 B2 | 1/2005 | Sanchez et al. |
| 6,840,938 B1 | 1/2005 | Morley et al. |
| 6,843,403 B2 | 1/2005 | Whitman |
| 6,846,309 B2 | 1/2005 | Whitman et al. |
| 6,866,671 B2 | 3/2005 | Tierney et al. |
| 6,871,117 B2 | 3/2005 | Wang et al. |
| 6,879,880 B2 | 4/2005 | Nowlin et al. |
| 6,899,705 B2 | 5/2005 | Niemeyer |
| 6,902,560 B1 | 6/2005 | Morley et al. |
| 6,936,042 B2 | 8/2005 | Wallace et al. |
| 6,951,535 B2 | 10/2005 | Ghodoussi et al. |
| 6,974,449 B2 | 12/2005 | Niemeyer |
| 6,991,627 B2 | 1/2006 | Madhani et al. |
| 6,994,708 B2 | 2/2006 | Manzo |
| 7,048,745 B2 | 5/2006 | Tierney et al. |
| 7,066,926 B2 | 6/2006 | Wallace et al. |
| 7,118,582 B1 | 10/2006 | Wang et al. |
| 7,125,403 B2 | 10/2006 | Julian et al. |
| 7,155,315 B2 | 12/2006 | Niemeyer et al. |
| 7,239,940 B2 | 7/2007 | Wang et al. |
| 7,306,597 B2 | 12/2007 | Manzo |
| 7,357,774 B2 | 4/2008 | Cooper |
| 7,373,219 B2 | 5/2008 | Nowlin et al. |
| 7,379,790 B2 | 5/2008 | Toth et al. |
| 7,386,365 B2 | 6/2008 | Nixon |
| 7,391,173 B2 | 6/2008 | Schena |
| 7,398,707 B2 | 7/2008 | Morley et al. |
| 7,413,565 B2 | 8/2008 | Wang et al. |
| 7,453,227 B2 | 11/2008 | Prisco et al. |
| 7,524,320 B2 | 4/2009 | Tierney et al. |
| 7,574,250 B2 | 8/2009 | Niemeyer |
| 7,594,912 B2 | 9/2009 | Cooper et al. |
| 7,607,440 B2 | 10/2009 | Coste-Maniere et al. |
| 7,666,191 B2 | 2/2010 | Orban, III et al. |
| 7,682,357 B2 | 3/2010 | Ghodoussi et al. |
| 7,689,320 B2 | 3/2010 | Prisco et al. |
| 7,695,481 B2 | 4/2010 | Wang et al. |
| 7,695,485 B2 | 4/2010 | Whitman et al. |
| 7,699,855 B2 | 4/2010 | Anderson et al. |
| 7,713,263 B2 | 5/2010 | Niemeyer |
| 7,725,214 B2 | 5/2010 | Diolaiti |
| 7,727,244 B2 | 6/2010 | Orban, III et al. |
| 7,741,802 B2 | 6/2010 | Prisco |
| 7,756,036 B2 | 7/2010 | Druke et al. |
| 7,757,028 B2 | 7/2010 | Druke et al. |
| 7,762,825 B2 | 7/2010 | Burbank et al. |
| 7,778,733 B2 | 8/2010 | Nowlin et al. |
| 7,803,151 B2 | 9/2010 | Whitman |
| 7,806,891 B2 | 10/2010 | Nowlin et al. |
| 7,819,859 B2 | 10/2010 | Prisco et al. |
| 7,819,885 B2 | 10/2010 | Cooper |
| 7,824,401 B2 | 11/2010 | Manzo et al. |
| 7,835,823 B2 | 11/2010 | Sillman et al. |
| 7,843,158 B2 | 11/2010 | Prisco |
| 7,865,266 B2 | 1/2011 | Moll et al. |
| 7,865,269 B2 | 1/2011 | Prisco et al. |
| 7,886,743 B2 | 2/2011 | Cooper et al. |
| 7,899,578 B2 | 3/2011 | Prisco et al. |
| 7,907,166 B2 | 3/2011 | Lamprecht et al. |
| 7,935,130 B2 | 5/2011 | Williams |
| 7,963,913 B2 | 6/2011 | Devengenzo et al. |
| 7,983,793 B2 | 7/2011 | Toth et al. |
| 8,002,767 B2 | 8/2011 | Sanchez |
| 8,004,229 B2 | 8/2011 | Nowlin et al. |
| 8,012,170 B2 | 9/2011 | Whitman et al. |
| 8,054,752 B2 | 11/2011 | Druke et al. |
| 8,062,288 B2 | 11/2011 | Cooper et al. |
| 8,079,950 B2 | 12/2011 | Stern et al. |
| 8,100,133 B2 | 1/2012 | Mintz et al. |
| 8,108,072 B2 | 1/2012 | Zhao et al. |
| 8,120,301 B2 | 2/2012 | Goldberg et al. |
| 8,142,447 B2 | 3/2012 | Cooper et al. |
| 8,147,503 B2 | 4/2012 | Zhao et al. |
| 8,151,661 B2 | 4/2012 | Schena et al. |
| 8,155,479 B2 | 4/2012 | Hoffman et al. |
| 8,182,469 B2 | 5/2012 | Anderson et al. |
| 8,202,278 B2 | 6/2012 | Orban, III et al. |
| 8,206,406 B2 | 6/2012 | Orban, III |
| 8,210,413 B2 | 7/2012 | Whitman et al. |
| 8,216,250 B2 | 7/2012 | Orban, III et al. |
| 8,220,468 B2 | 7/2012 | Cooper et al. |
| 8,256,319 B2 | 9/2012 | Cooper et al. |
| 8,285,517 B2 | 10/2012 | Sillman et al. |
| 8,315,720 B2 | 11/2012 | Mohr et al. |
| 8,335,590 B2 | 12/2012 | Costa et al. |
| 8,347,757 B2 | 1/2013 | Duval |
| 8,374,723 B2 | 2/2013 | Zhao et al. |
| 8,418,073 B2 | 4/2013 | Mohr et al. |
| 8,419,717 B2 | 4/2013 | Diolaiti et al. |
| 8,423,182 B2 | 4/2013 | Robinson et al. |
| 8,452,447 B2 | 5/2013 | Nixon |
| 8,454,585 B2 | 6/2013 | Whitman |
| 8,499,992 B2 | 8/2013 | Whitman et al. |
| 8,508,173 B2 | 8/2013 | Goldberg et al. |
| 8,528,440 B2 | 9/2013 | Morley et al. |
| 8,529,582 B2 | 9/2013 | Devengenzo et al. |
| 8,540,748 B2 | 9/2013 | Murphy et al. |
| 8,551,116 B2 | 10/2013 | Julian et al. |
| 8,562,594 B2 | 10/2013 | Cooper et al. |
| 8,594,841 B2 | 11/2013 | Zhao et al. |
| 8,597,182 B2 | 12/2013 | Stein et al. |
| 8,597,280 B2 | 12/2013 | Cooper et al. |
| 8,600,551 B2 | 12/2013 | Itkowitz et al. |
| 8,608,773 B2 | 12/2013 | Tierney et al. |
| 8,620,473 B2 | 12/2013 | Diolaiti et al. |
| 8,624,537 B2 | 1/2014 | Nowlin et al. |
| 8,634,957 B2 | 1/2014 | Toth et al. |
| 8,638,056 B2 | 1/2014 | Goldberg et al. |
| 8,638,057 B2 | 1/2014 | Goldberg et al. |
| 8,644,988 B2 | 2/2014 | Prisco et al. |

(56) References Cited

U.S. PATENT DOCUMENTS

| | | |
|---|---|---|
| 8,666,544 B2 | 3/2014 | Moll et al. |
| 8,668,638 B2 | 3/2014 | Donhowe et al. |
| 8,746,252 B2 | 6/2014 | McGrogan et al. |
| 8,749,189 B2 | 6/2014 | Nowlin et al. |
| 8,749,190 B2 | 6/2014 | Nowlin et al. |
| 8,758,352 B2 | 6/2014 | Cooper et al. |
| 8,761,930 B2 | 6/2014 | Nixon |
| 8,768,516 B2 | 7/2014 | Diolaiti et al. |
| 8,786,241 B2 | 7/2014 | Nowlin et al. |
| 8,790,243 B2 | 7/2014 | Cooper et al. |
| 8,808,164 B2 | 8/2014 | Hoffman et al. |
| 8,816,628 B2 | 8/2014 | Nowlin et al. |
| 8,821,480 B2 | 9/2014 | Burbank |
| 8,823,308 B2 | 9/2014 | Nowlin et al. |
| 8,827,989 B2 | 9/2014 | Niemeyer |
| 8,838,270 B2 | 9/2014 | Druke et al. |
| 8,852,174 B2 | 10/2014 | Burbank |
| 8,858,547 B2 | 10/2014 | Brogna |
| 8,862,268 B2 | 10/2014 | Robinson et al. |
| 8,864,751 B2 | 10/2014 | Prisco et al. |
| 8,864,752 B2 | 10/2014 | Diolaiti et al. |
| 8,903,546 B2 | 12/2014 | Diolaiti et al. |
| 8,903,549 B2 | 12/2014 | Itkowitz et al. |
| 8,911,428 B2 | 12/2014 | Cooper et al. |
| 8,912,746 B2 | 12/2014 | Reid et al. |
| 8,944,070 B2 | 2/2015 | Guthart |
| 8,989,903 B2 | 3/2015 | Weir et al. |
| 9,002,518 B2 | 4/2015 | Manzo |
| 9,014,856 B2 | 4/2015 | Manzo et al. |
| 9,016,540 B2 | 4/2015 | Whitman et al. |
| 9,019,345 B2 | 4/2015 | O'Grady et al. |
| 9,043,027 B2 | 5/2015 | Durant et al. |
| 9,050,120 B2 | 6/2015 | Swarup et al. |
| 9,055,961 B2 | 6/2015 | Manzo et al. |
| 9,068,628 B2 | 6/2015 | Solomon et al. |
| 9,078,684 B2 | 7/2015 | Williams |
| 9,084,623 B2 | 7/2015 | Gomez et al. |
| 9,095,362 B2 | 8/2015 | Dachs, II et al. |
| 9,096,033 B2 | 8/2015 | Holop et al. |
| 9,101,381 B2 | 8/2015 | Burbank et al. |
| 9,113,877 B1 | 8/2015 | Whitman et al. |
| 9,138,284 B2 | 9/2015 | Krom et al. |
| 9,144,456 B2 | 9/2015 | Rosa et al. |
| 9,198,730 B2 | 12/2015 | Prisco et al. |
| 9,204,923 B2 | 12/2015 | Manzo et al. |
| 9,226,648 B2 | 1/2016 | Saadat et al. |
| 9,226,750 B2 | 1/2016 | Weir et al. |
| 9,226,761 B2 | 1/2016 | Burbank |
| 9,232,984 B2 | 1/2016 | Guthart et al. |
| 9,241,766 B2 | 1/2016 | Duque et al. |
| 9,241,767 B2 | 1/2016 | Prisco et al. |
| 9,241,769 B2 | 1/2016 | Larkin et al. |
| 9,259,275 B2 | 2/2016 | Burbank |
| 9,259,277 B2 | 2/2016 | Rogers et al. |
| 9,259,281 B2 | 2/2016 | Griffiths et al. |
| 9,259,282 B2 | 2/2016 | Azizian et al. |
| 9,261,172 B2 | 2/2016 | Solomon et al. |
| 9,265,567 B2 | 2/2016 | Orban, III et al. |
| 9,265,584 B2 | 2/2016 | Itkowitz et al. |
| 9,283,049 B2 | 3/2016 | Diolaiti et al. |
| 9,301,811 B2 | 4/2016 | Goldberg et al. |
| 9,314,307 B2 | 4/2016 | Richmond et al. |
| 9,317,651 B2 | 4/2016 | Nixon |
| 9,345,546 B2 | 5/2016 | Toth et al. |
| 9,393,017 B2 | 7/2016 | Flanagan et al. |
| 9,402,689 B2 | 8/2016 | Prisco et al. |
| 9,417,621 B2 | 8/2016 | Diolaiti |
| 9,424,303 B2 | 8/2016 | Hoffman et al. |
| 9,433,418 B2 | 9/2016 | Whitman et al. |
| 9,446,517 B2 | 9/2016 | Burns et al. |
| 9,452,020 B2 | 9/2016 | Griffiths et al. |
| 9,474,569 B2 | 10/2016 | Manzo et al. |
| 9,480,533 B2 | 11/2016 | Devengenzo et al. |
| 9,503,713 B2 | 11/2016 | Zhao et al. |
| 9,550,300 B2 | 1/2017 | Danitz et al. |
| 9,554,859 B2 | 1/2017 | Nowlin et al. |
| 9,566,124 B2 | 2/2017 | Prisco et al. |
| 9,579,164 B2 | 2/2017 | Itkowitz et al. |
| 9,585,641 B2 | 3/2017 | Cooper et al. |
| 9,615,883 B2 | 4/2017 | Schena et al. |
| 9,623,563 B2 | 4/2017 | Nixon |
| 9,623,902 B2 | 4/2017 | Griffiths et al. |
| 9,629,520 B2 | 4/2017 | Diolaiti |
| 9,662,177 B2 | 5/2017 | Weir et al. |
| 9,664,262 B2 | 5/2017 | Donlon et al. |
| 9,675,354 B2 | 6/2017 | Weir et al. |
| 9,687,312 B2 | 6/2017 | Dachs, II et al. |
| 9,700,334 B2 | 7/2017 | Hinman et al. |
| 9,718,190 B2 | 8/2017 | Larkin et al. |
| 9,730,719 B2 | 8/2017 | Brisson et al. |
| 9,737,199 B2 | 8/2017 | Pistor et al. |
| 9,795,446 B2 | 10/2017 | DiMaio et al. |
| 9,797,484 B2 | 10/2017 | Solomon et al. |
| 9,801,690 B2 | 10/2017 | Larkin et al. |
| 9,814,530 B2 | 11/2017 | Weir et al. |
| 9,814,536 B2 | 11/2017 | Goldberg et al. |
| 9,814,537 B2 | 11/2017 | Itkowitz et al. |
| 9,820,823 B2 | 11/2017 | Richmond et al. |
| 9,827,059 B2 | 11/2017 | Robinson et al. |
| 9,830,371 B2 | 11/2017 | Hoffman et al. |
| 9,839,481 B2 | 12/2017 | Blumenkranz et al. |
| 9,839,487 B2 | 12/2017 | Dachs, II |
| 9,850,994 B2 | 12/2017 | Schena |
| 9,855,102 B2 | 1/2018 | Blumenkranz |
| 9,855,107 B2 | 1/2018 | Labonville et al. |
| 9,872,737 B2 | 1/2018 | Nixon |
| 9,877,718 B2 | 1/2018 | Weir et al. |
| 9,883,920 B2 | 2/2018 | Blumenkranz |
| 9,888,974 B2 | 2/2018 | Niemeyer |
| 9,895,813 B2 | 2/2018 | Blumenkranz et al. |
| 9,901,408 B2 | 2/2018 | Larkin |
| 9,918,800 B2 | 3/2018 | Itkowitz et al. |
| 9,943,375 B2 | 4/2018 | Blumenkranz et al. |
| 9,948,852 B2 | 4/2018 | Lilagan et al. |
| 9,949,798 B2 | 4/2018 | Weir |
| 9,949,802 B2 | 4/2018 | Cooper |
| 9,952,107 B2 | 4/2018 | Blumenkranz et al. |
| 9,956,044 B2 | 5/2018 | Gomez et al. |
| 9,980,778 B2 | 5/2018 | Ohline et al. |
| 10,008,017 B2 | 6/2018 | Itkowitz et al. |
| 10,028,793 B2 | 7/2018 | Griffiths et al. |
| 10,033,308 B2 | 7/2018 | Chaghajerdi et al. |
| 10,034,719 B2 | 7/2018 | Richmond et al. |
| 10,052,167 B2 | 8/2018 | Au et al. |
| 10,085,811 B2 | 10/2018 | Weir et al. |
| 10,092,344 B2 | 10/2018 | Mohr et al. |
| 10,123,844 B2 | 11/2018 | Nowlin |
| 10,188,471 B2 | 1/2019 | Brisson |
| 10,201,390 B2 | 2/2019 | Swarup et al. |
| 10,213,202 B2 | 2/2019 | Flanagan et al. |
| 10,258,416 B2 | 4/2019 | Mintz et al. |
| 10,278,782 B2 | 5/2019 | Jarc et al. |
| 10,278,783 B2 | 5/2019 | Itkowitz et al. |
| 10,282,881 B2 | 5/2019 | Itkowitz et al. |
| 10,335,242 B2 | 7/2019 | Devengenzo et al. |
| 10,405,934 B2 | 9/2019 | Prisco et al. |
| 10,433,922 B2 | 10/2019 | Itkowitz et al. |
| 10,464,219 B2 | 11/2019 | Robinson et al. |
| 10,485,621 B2 | 11/2019 | Morrissette et al. |
| 10,500,004 B2 | 12/2019 | Hanuschik et al. |
| 10,500,005 B2 | 12/2019 | Weir et al. |
| 10,500,007 B2 | 12/2019 | Richmond et al. |
| 10,507,066 B2 | 12/2019 | DiMaio et al. |
| 10,510,267 B2 | 12/2019 | Jarc et al. |
| 10,524,871 B2 | 1/2020 | Liao |
| 10,548,459 B2 | 2/2020 | Itkowitz et al. |
| 10,575,909 B2 | 3/2020 | Robinson et al. |
| 10,592,529 B2 | 3/2020 | Hoffman et al. |
| 10,595,946 B2 | 3/2020 | Nixon |
| 10,881,469 B2 | 1/2021 | Robinson |
| 10,881,473 B2 | 1/2021 | Itkowitz et al. |
| 10,898,188 B2 | 1/2021 | Burbank |
| 10,898,189 B2 | 1/2021 | McDonald, II |
| 10,905,506 B2 | 2/2021 | Itkowitz et al. |

(56) References Cited

U.S. PATENT DOCUMENTS

| | | |
|---|---|---|
| 10,912,544 B2 | 2/2021 | Brisson et al. |
| 10,912,619 B2 | 2/2021 | Jarc et al. |
| 10,918,387 B2 | 2/2021 | Duque et al. |
| 10,918,449 B2 | 2/2021 | Solomon et al. |
| 10,932,873 B2 | 3/2021 | Griffiths et al. |
| 10,932,877 B2 | 3/2021 | Devengenzo et al. |
| 10,939,969 B2 | 3/2021 | Swarup et al. |
| 10,939,973 B2 | 3/2021 | DiMaio et al. |
| 10,952,801 B2 | 3/2021 | Miller et al. |
| 10,965,933 B2 | 3/2021 | Jarc |
| 10,966,742 B2 | 4/2021 | Rosa et al. |
| 10,973,517 B2 | 4/2021 | Wixey |
| 10,973,519 B2 | 4/2021 | Weir et al. |
| 10,984,567 B2 | 4/2021 | Itkowitz et al. |
| 10,993,773 B2 | 5/2021 | Cooper et al. |
| 10,993,775 B2 | 5/2021 | Cooper et al. |
| 11,000,331 B2 | 5/2021 | Krom et al. |
| 11,013,567 B2 | 5/2021 | Wu et al. |
| 11,020,138 B2 | 6/2021 | Ragosta |
| 11,020,191 B2 | 6/2021 | Diolaiti et al. |
| 11,020,193 B2 | 6/2021 | Wixey et al. |
| 11,026,755 B2 | 6/2021 | Weir et al. |
| 11,026,759 B2 | 6/2021 | Donlon et al. |
| 11,040,189 B2 | 6/2021 | Vaders et al. |
| 11,045,077 B2 | 6/2021 | Stern et al. |
| 11,045,274 B2 | 6/2021 | Dachs, II et al. |
| 11,058,501 B2 | 7/2021 | Tokarchuk et al. |
| 11,076,925 B2 | 8/2021 | DiMaio et al. |
| 11,090,119 B2 | 8/2021 | Burbank |
| 11,096,687 B2 | 8/2021 | Flanagan et al. |
| 11,098,803 B2 | 8/2021 | Duque et al. |
| 11,109,925 B2 | 9/2021 | Cooper et al. |
| 11,116,578 B2 | 9/2021 | Hoffman et al. |
| 11,129,683 B2 | 9/2021 | Steger et al. |
| 11,135,029 B2 | 10/2021 | Suresh et al. |
| 11,147,552 B2 | 10/2021 | Burbank et al. |
| 11,147,640 B2 | 10/2021 | Jarc et al. |
| 11,154,373 B2 | 10/2021 | Abbott et al. |
| 11,154,374 B2 | 10/2021 | Hanuschik et al. |
| 11,160,622 B2 | 11/2021 | Goldberg et al. |
| 11,160,625 B2 | 11/2021 | Wixey et al. |
| 11,161,243 B2 | 11/2021 | Rabindran et al. |
| 11,166,758 B2 | 11/2021 | Mohr et al. |
| 11,166,770 B2 | 11/2021 | DiMaio et al. |
| 11,166,773 B2 | 11/2021 | Ragosta et al. |
| 11,173,597 B2 | 11/2021 | Rabindran et al. |
| 11,185,378 B2 | 11/2021 | Weir et al. |
| 11,191,596 B2 | 12/2021 | Thompson et al. |
| 11,197,729 B2 | 12/2021 | Thompson et al. |
| 11,213,360 B2 | 1/2022 | Hourtash et al. |
| 11,221,863 B2 | 1/2022 | Azizian et al. |
| 11,234,700 B2 | 2/2022 | Ragosta et al. |
| 11,241,274 B2 | 2/2022 | Vaders et al. |
| 11,241,290 B2 | 2/2022 | Waterbury et al. |
| 11,259,870 B2 | 3/2022 | DiMaio et al. |
| 11,259,884 B2 | 3/2022 | Burbank |
| 11,272,993 B2 | 3/2022 | Gomez et al. |
| 11,272,994 B2 | 3/2022 | Saraliev et al. |
| 11,291,442 B2 | 4/2022 | Wixey et al. |
| 11,291,513 B2 | 4/2022 | Manzo et al. |
| 2010/0023005 A1* | 1/2010 | Yamamoto ......... A61B 18/1445 606/41 |
| 2013/0079760 A1* | 3/2013 | Twomey ............ A61B 18/1445 606/205 |
| 2014/0031819 A1* | 1/2014 | Dycus ................. A61B 18/085 606/47 |
| 2014/0100564 A1* | 4/2014 | Garrison ............. A61B 18/085 156/60 |
| 2015/0133928 A1* | 5/2015 | Soni .................... A61B 18/1445 606/51 |
| 2017/0020601 A1* | 1/2017 | Thomson ............. A61B 17/282 |
| 2021/0022819 A1* | 1/2021 | Duque ............... A61B 18/1445 |

\* cited by examiner

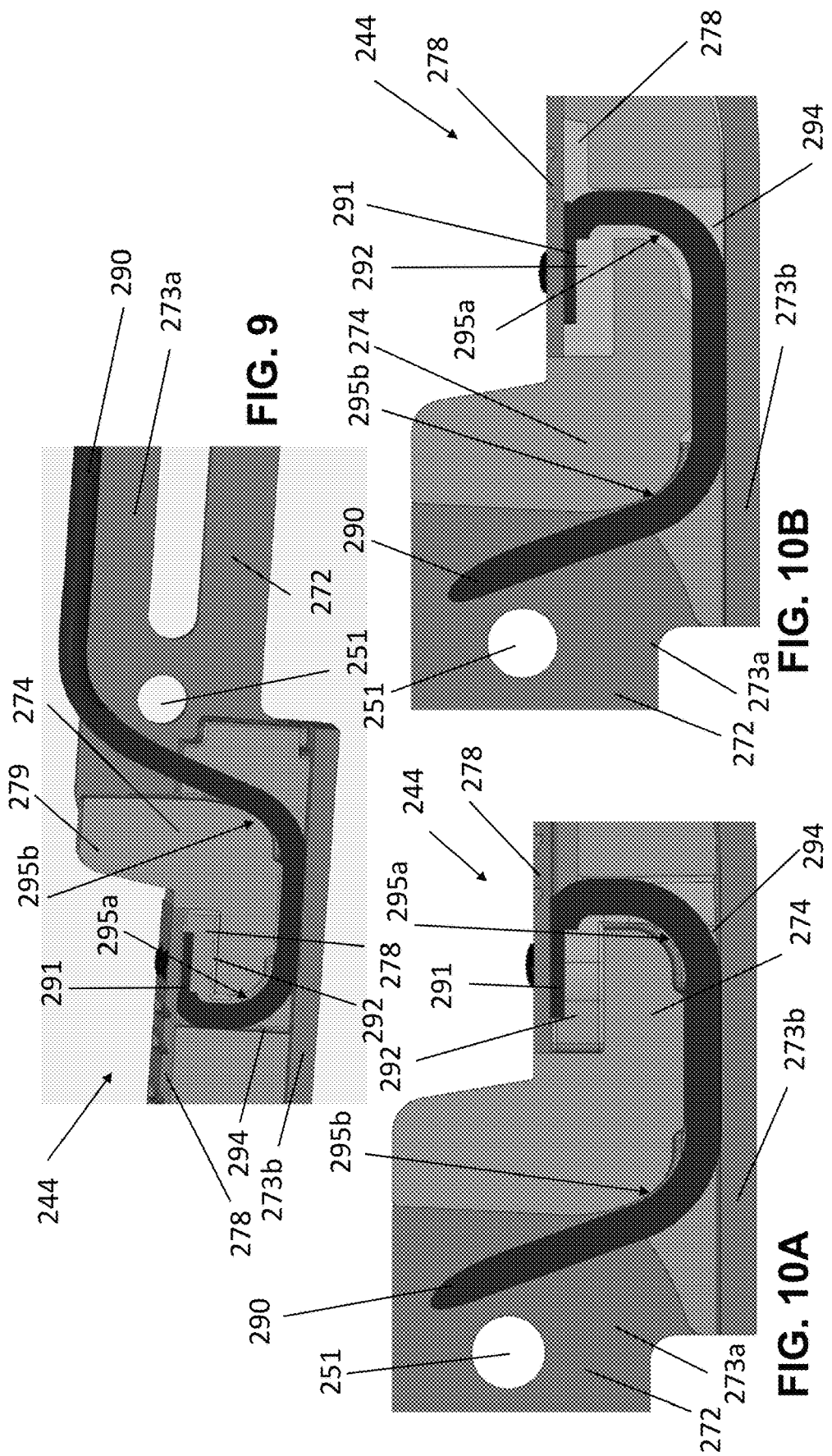

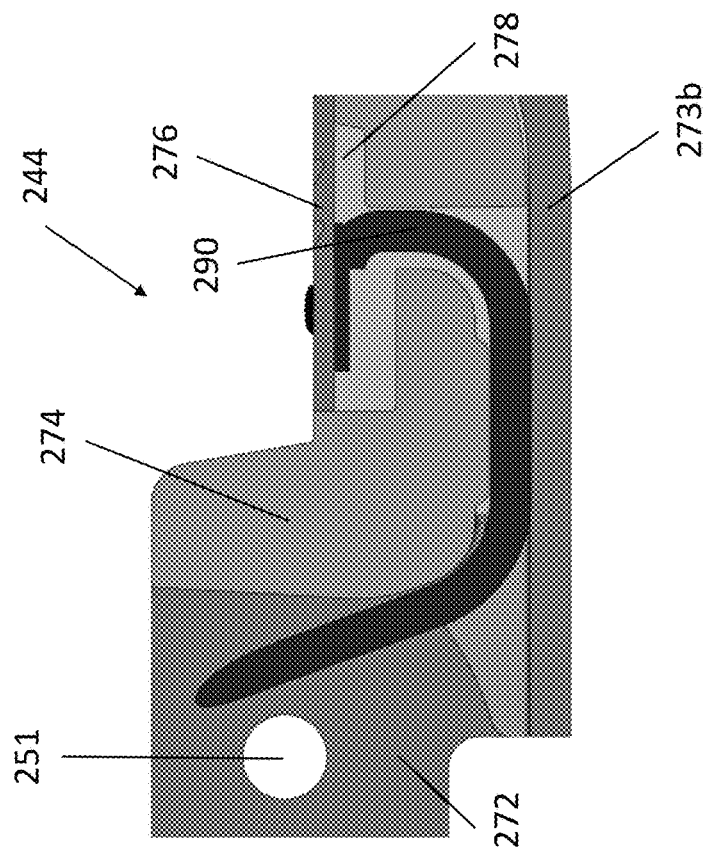
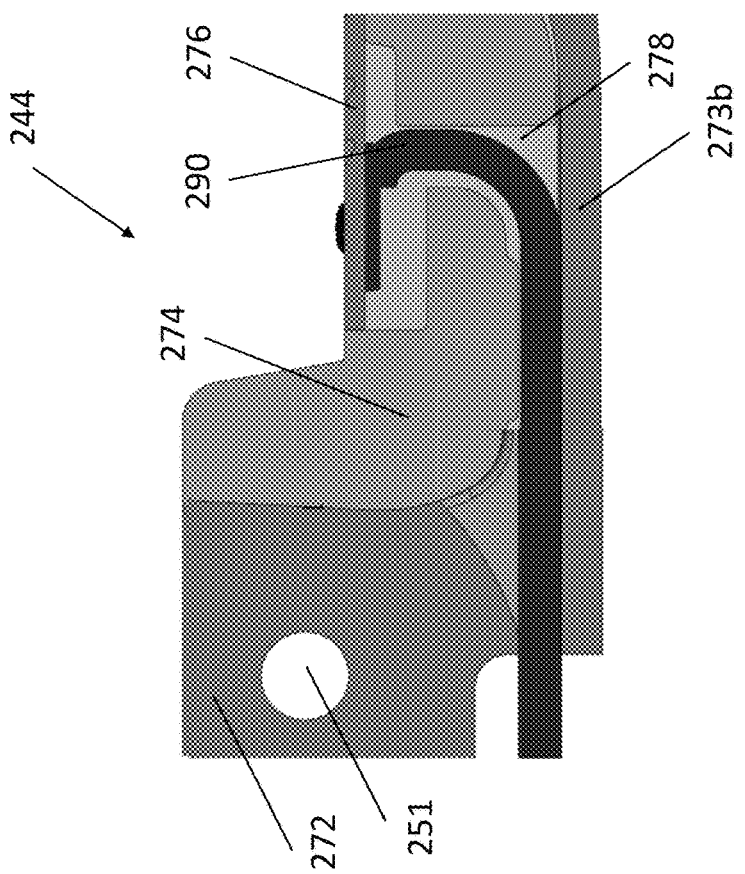
FIG. 12A
FIG. 12B

JAW MEMBER, END EFFECTOR ASSEMBLY, AND METHOD OF MANUFACTURING A JAW MEMBER OF AN ELECTROSURGICAL INSTRUMENT

CROSS-REFERENCE TO RELATED APPLICATION

This application claims the benefit of, and priority to, U.S. Provisional Patent Application No. 63/286,192, filed on Dec. 6, 2021, the entire contents of which are hereby incorporated herein by reference.

FIELD

This disclosure relates to surgical instruments and, more specifically, to a jaw member, end effector assembly, and method of manufacturing a jaw member of a surgical instrument such as, for example, for use in surgical robotic systems.

BACKGROUND

Surgical robotic systems are increasingly utilized in various different surgical procedures. Some surgical robotic systems include a console supporting a robotic arm. One or more different surgical instruments may be configured for use with the surgical robotic system and selectively mountable to the robotic arm. The robotic arm provides one or more inputs to the mounted surgical instrument to enable operation of the mounted surgical instrument.

A surgical forceps, one type of instrument capable of being utilized with a robotic surgical system, relies on mechanical action between its jaw members to grasp, clamp, and constrict tissue. Electrosurgical forceps utilize both mechanical clamping action and energy to heat tissue to treat, e.g., coagulate, cauterize, or seal, tissue. Typically, once tissue is treated, the tissue is severed using a cutting element. Accordingly, electrosurgical forceps are designed to incorporate a cutting element to effectively sever treated tissue. Alternatively, energy based, e.g., thermal, electrical, ultrasonic, etc., cutting mechanisms may be implemented.

SUMMARY

As used herein, the term "distal" refers to the portion that is being described which is farther from an operator (whether a human surgeon or a surgical robot), while the term "proximal" refers to the portion that is being described which is closer to the operator. Terms including "generally," "about," "substantially," and the like, as utilized herein, are meant to encompass variations, e.g., manufacturing tolerances, material tolerances, use and environmental tolerances, measurement variations, design variations, and/or other variations, up to and including plus or minus 10 percent. To the extent consistent, any of the aspects described herein may be used in conjunction with any or all of the other aspects described herein.

Provided in accordance with aspects of this disclosure is a jaw member of a surgical instrument. The jaw member includes a structural frame, an insulative spacer supported on the structural frame, an electrically conductive tissue contacting plate supported on the insulative spacer, and a lead wire attached to an underside of the electrically conductive tissue contacting plate. The insulative spacer defines a pocket at an upper portion thereof and includes a channel extending from the pocket, through the insulative spacer, to a bottom portion of the insulative spacer. The channel defines a substantially U-shaped configuration having first and second radiused corners at the bottom portion of the insulative spacer. The lead wire is attached to an underside of the electrically conductive tissue contacting plate at an attachment point within the pocket and extends distally from the attachment point into the channel, through the channel, over the first and second radiused corners, and proximally from the jaw member. The lead wire is adapted to connect to a source of energy to energize the electrically conductive tissue contacting plate for treating tissue.

In an aspect of this disclosure, an overmold material fills the pocket and a portion of the channel.

In another aspect of this disclosure, the overmold material fills the pocket and the portion of the channel distal of the first radiused corner of the channel.

In still another aspect of this disclosure, the lead wire is interference fit within the channel proximally of the first radiused corner of the channel such that the overmold material is inhibited from flowing proximally beyond the first radiused corner.

In yet another aspect of this disclosure, the overmold material further surrounds at least a portion of the jaw member to define an outer housing thereof.

In another aspect of this disclosure, the structural frame includes a proximal flange portion and a distal body portion. The distal body portion supports the insulative spacer thereon. The proximal flange portion may define a pivot aperture for pivotably coupling the jaw member to another jaw member.

In still yet another aspect of this disclosure, the lead wire is routed from the second radiused corner of the channel of the insulative spacer to traverse the pivot aperture of the proximal flange portion.

In another aspect of this disclosure, a portion of the insulative spacer extends beyond the electrically conductive tissue contacting surface at a proximal end thereof to define a proximal tissue stop. In such aspects, a proximally-facing wall of the proximal tissue stop may include the second radiused corner of the channel.

Also provided in accordance with aspects of this disclosure is an end effector assembly of a surgical instrument. The end effector assembly includes a clevis, a fixed jaw member fixed relative to the clevis, and a pivotable jaw member pivotable relative to the fixed jaw member and the clevis. The fixed jaw member includes a structural frame, an insulative spacer supported on the structural frame, an electrically conductive tissue contacting plate supported on the insulative spacer, and a lead wire attached to an underside of the electrically conductive tissue contacting plate at an attachment point. The insulative spacer includes a channel extending from an upper portion of the insulative spacer, through the insulative spacer, to a bottom portion of the insulative spacer. The channel has first and second radiused corners at the bottom portion of the insulative spacer. The lead wire extends distally from the attachment point into the channel, through the channel, over the first and second radiused corners, and proximally into the clevis. The pivotable jaw member includes an electrically conductive tissue contacting plate and a lead wire connected thereto. The lead wires are adapted to connect to a source of energy to conduct energy between the electrically conductive tissue contacting plates of the fixed and pivotable jaw members and through tissue grasped therebetween for treating tissue.

In an aspect of this disclosure, an overmold material fills a portion of the channel. The overmold material, in aspects, fills the portion of the channel distal of the first radiused corner of the channel. Alternatively or additionally, the overmold material further surrounds at least a portion of the fixed jaw member to define an outer housing thereof.

In another aspect of this disclosure, the structural frame includes a proximal flange portion and a distal body portion. The distal body portion supports the insulative spacer thereon and/or the proximal flange portion defines a pivot aperture for pivotably coupling the fixed jaw member to the pivotable jaw member via a pivot pin.

In still another aspect of this disclosure, the lead wire of the fixed jaw member is routed from the second radiused corner of the channel of the insulative spacer to traverse the pivot pin and extend proximally through the clevis.

In yet another aspect of this disclosure, the clevis forms part of or is attached to a distal portion of a shaft. The shaft has an articulating portion to enable articulation of the end effector assembly relative to a proximal portion of the shaft.

A method of manufacturing a jaw member of a surgical instrument provided in accordance with aspects of this disclosure includes attaching a lead wire to an underside of an electrically conductive tissue contacting plate at an attachment point, positioning the electrically conductive tissue contacting plate on an insulative spacer such that the attachment point is disposed within a pocket of the insulative spacer, routing the lead wire through a channel defined within the insulative spacer from the pocket at an upper portion of the insulative spacer, through the insulative spacer, to a bottom portion of the insulative spacer with an extending portion of the lead wire extending proximally from the insulative spacer, manipulating the extending portion of the lead wire to extend straight in a longitudinal direction, overmolding material into the pocket and a portion of the channel, and manipulating the extending portion of the lead wire to define at least one bend.

In aspects of this disclosure, manipulating the extending portion of the lead wire to define the at least one bend includes bending the lead wire about a radiused corner of the channel of the insulative spacer.

BRIEF DESCRIPTION OF THE DRAWINGS

The above and other aspects and features of this disclosure will become more apparent in view of the following detailed description when taken in conjunction with the accompanying drawings wherein like reference numerals identify similar or identical elements.

FIG. 9 is a perspective, longitudinal, cross-sectional view of a portion of one of the jaw members of the end effector assembly of FIG. 8;

FIGS. 10A and 10B are side, longitudinal, cross-sectional views of a portion of one of the jaw members of the end effector assembly of FIG. 8 without and with the outer housing, respectively;

FIGS. 12A and 12B illustrate are side, longitudinal, cross-sectional views of a portion of one of the jaw members of the end effector assembly of FIG. 8 before and after manipulating the electrical lead wire to extend over the pivot, respectively.

DETAILED DESCRIPTION

This disclosure provides a jaw member and end effector assembly for a surgical instrument, surgical instrument including the same, and method of manufacturing a jaw member. As described in detail below, the jaw member, end effector assembly, and surgical instrument of this disclosure are configured for use with a surgical robotic system, which may include, for example, a surgical console, a control tower, and one or more movable carts having a surgical robotic arm coupled to a setup arm. The surgical console receives user input through one or more interface devices, which are interpreted by the control tower as movement commands for moving the surgical robotic arm. The surgical robotic arm includes a controller, which is configured to process the movement command and to generate a torque command for activating one or more actuators of the robotic arm, which, in turn, move the robotic arm in response to the movement command. Those skilled in the art will understand that this disclosure, although described in connection with surgical robotic systems, may also be adapted for use with handheld surgical instrument such as, for example, endoscopic surgical instruments and/or open surgical instruments.

Figure 1:
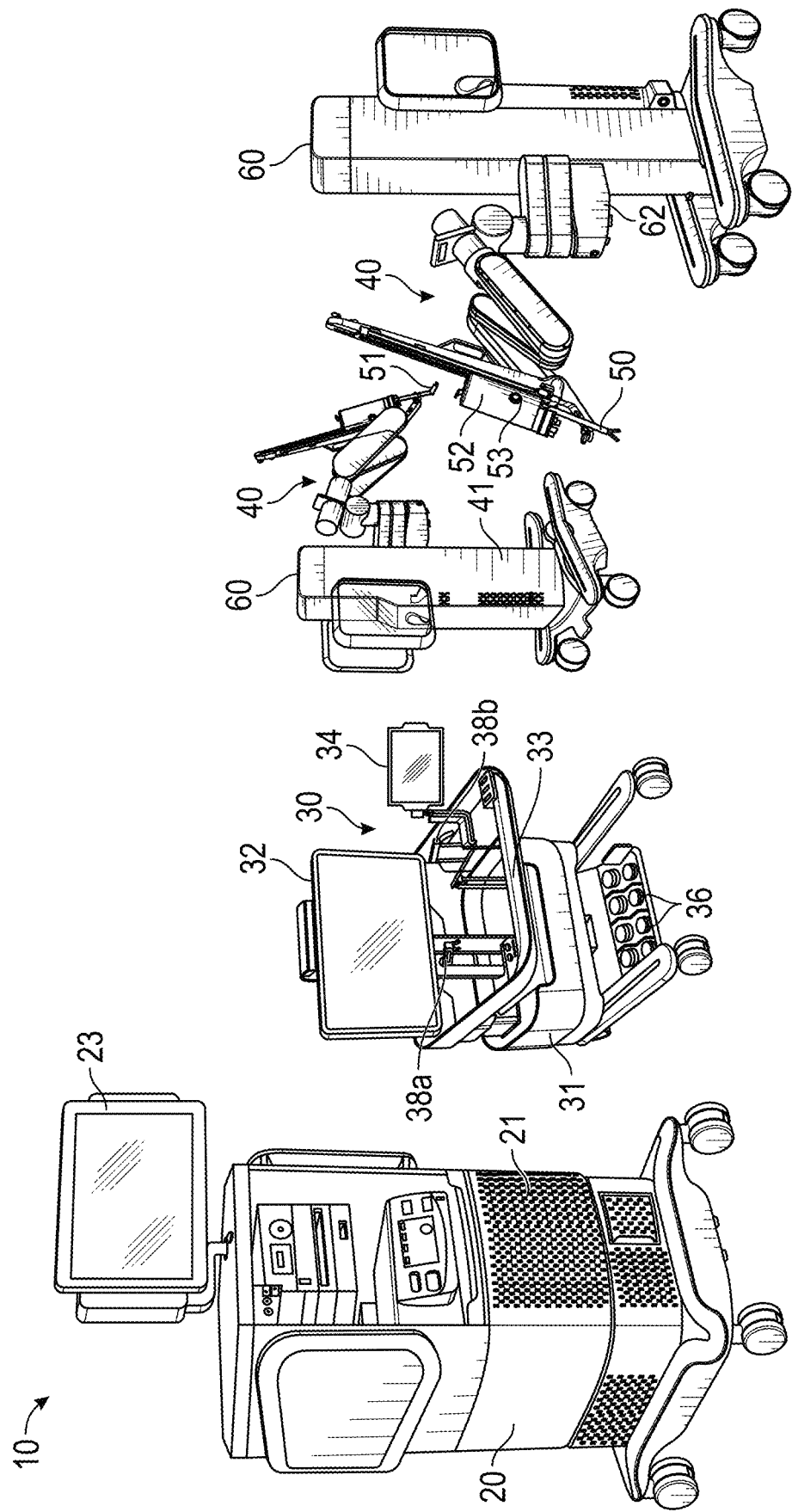
FIG. 1 is a schematic illustration of a surgical robotic system including a control tower, a console, and one or more surgical robotic arms according to aspects of this disclosure.

With reference to FIG. 1, a surgical robotic system 10 includes a control tower 20, which is connected to components of the surgical robotic system 10 including a surgical console 30 and one or more robotic arms 40. Each of the robotic arms 40 includes a surgical instrument 50 removably coupled thereto. Each of the robotic arms 40 is also coupled to a movable cart 60.

The one or more surgical instruments 50 may be configured for use during minimally invasive surgical procedures and/or open surgical procedures. In aspects, one of the surgical instruments 50 may be an endoscope, such as an endoscope camera 51, configured to provide a video feed for the clinician. In further aspects, one of the surgical instruments 50 may be an energy based surgical instrument such as, for example, an electrosurgical forceps or ultrasonic sealing and dissection instrument configured to seal tissue by grasping tissue between opposing structures and applying electrosurgical energy or ultrasonic energy, respectively, thereto. In yet further aspects, one of the surgical instruments 50 may be a surgical stapler including a pair of jaws configured to clamp tissue, deploy a plurality of tissue fasteners, e.g., staples, through the clamped tissue, and/or to cut the stapled tissue.

One of the robotic arms 40 may include a camera 51 configured to capture video of the surgical site. The surgical console 30 includes a first display 32, which displays a video feed of the surgical site provided by camera 51 of the surgical instrument 50 disposed on the robotic arms 40, and a second display 34, which displays a user interface for controlling the surgical robotic system 10. The first and second displays 32 and 34 are touchscreens allowing for displaying various graphical user inputs.

The surgical console 30 also includes a plurality of user interface devices, such as foot pedals 36 and a pair of handle controllers 38*a* and 38*b* which are used by a user to remotely control robotic arms 40. The surgical console further includes an armrest 33 used to support clinician's arms while operating the handle controllers 38*a* and 38*b*.

The control tower 20 includes a display 23, which may be a touchscreen, and outputs on the graphical user interfaces (GUIs). The control tower 20 also acts as an interface between the surgical console 30 and one or more robotic arms 40. In particular, the control tower 20 is configured to control the robotic arms 40, such as to move the robotic arms 40 and the corresponding surgical instrument 50, based on a set of programmable instructions and/or input commands from the surgical console 30, in such a way that robotic arms 40 and the surgical instrument 50 execute a desired movement sequence in response to input from the foot pedals 36 and the handle controllers 38*a* and 38*b*.

Each of the control tower 20, the surgical console 30, and the robotic arm 40 includes a respective computer 21, 31, 41. The computers 21, 31, 41 are interconnected to each other using any suitable communication network based on wired or wireless communication protocols. The term "network," whether plural or singular, as used herein, denotes a data network, including, but not limited to, the Internet, Intranet, a wide area network, or a local area networks, and without limitation as to the full scope of the definition of communication networks as encompassed by the present disclosure. Suitable protocols include, but are not limited to, transmission control protocol/internet protocol (TCP/IP), datagram protocol/internet protocol (UDP/IP), and/or datagram congestion control protocol (DCCP). Wireless communication may be achieved via one or more wireless configurations, e.g., radio frequency, optical, Wi-Fi, Bluetooth® (an open wireless protocol for exchanging data over short distances, using short length radio waves, from fixed and mobile devices, creating personal area networks (PANs)), ZigBee® (a specification for a suite of high level communication protocols using small, low-power digital radios based on the IEEE 122.15.4-2003 standard for wireless personal area networks (WPANs)).

The computers 21, 31, 41 may include any suitable processor (not shown) operably connected to a memory (not shown), which may include one or more of volatile, non-volatile, magnetic, optical, or electrical media, such as read-only memory (ROM), random access memory (RAM), electrically-erasable programmable ROM (EEPROM), non-volatile RAM (NVRAM), or flash memory. The processor may be any suitable processor (e.g., control circuit) adapted to perform the operations, calculations, and/or set of instructions described in the present disclosure including, but not limited to, a hardware processor, a field programmable gate array (FPGA), a digital signal processor (DSP), a central processing unit (CPU), a microprocessor, and combinations thereof. Those skilled in the art will appreciate that the processor may be substituted for by using any logic processor (e.g., control circuit) adapted to execute algorithms, calculations, and/or set of instructions described herein.

Figure 2:
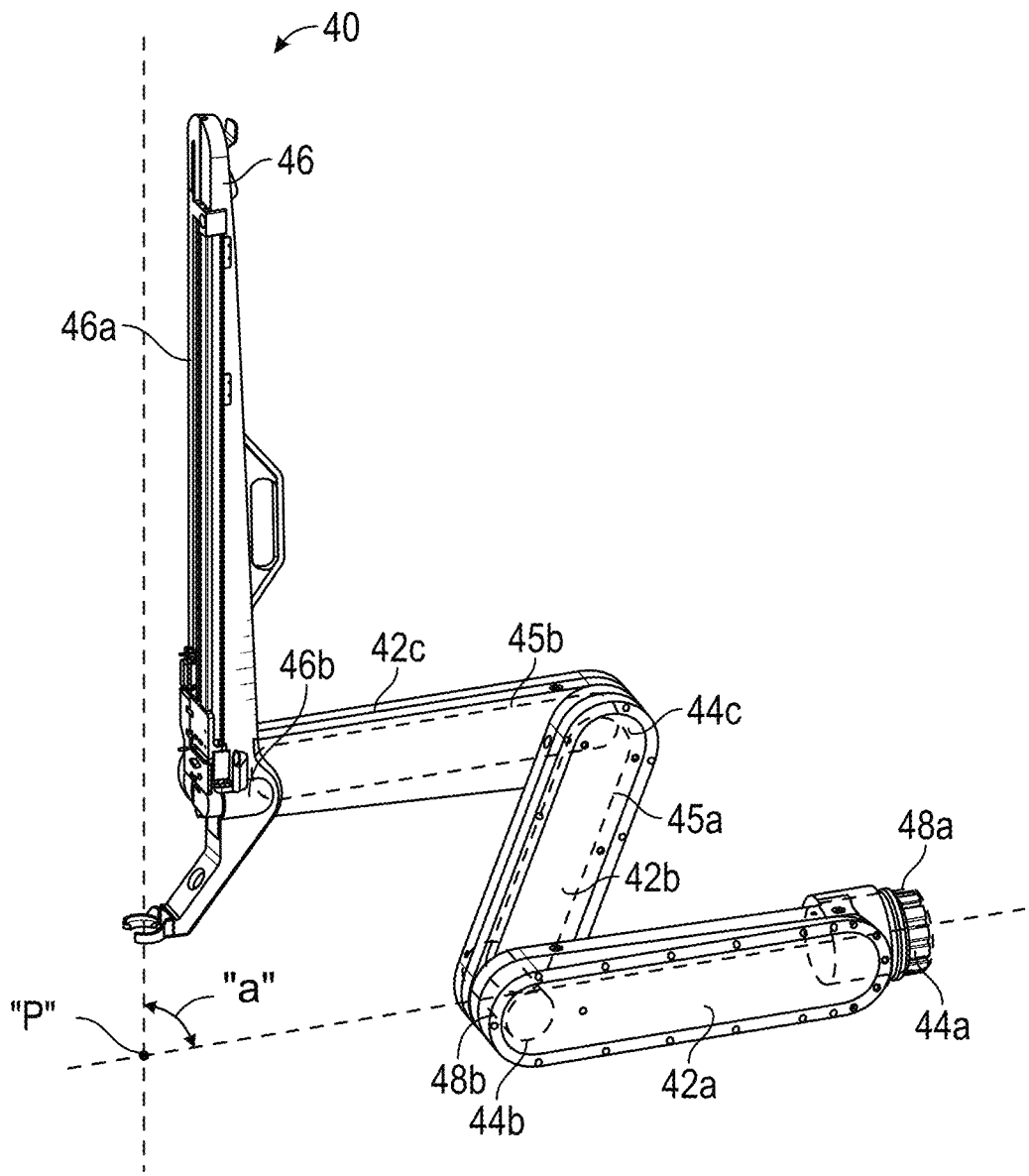
FIG. 2 is a perspective view of a surgical robotic arm of the surgical robotic system of FIG. 1 according to aspects of this disclosure.
Figure 3:
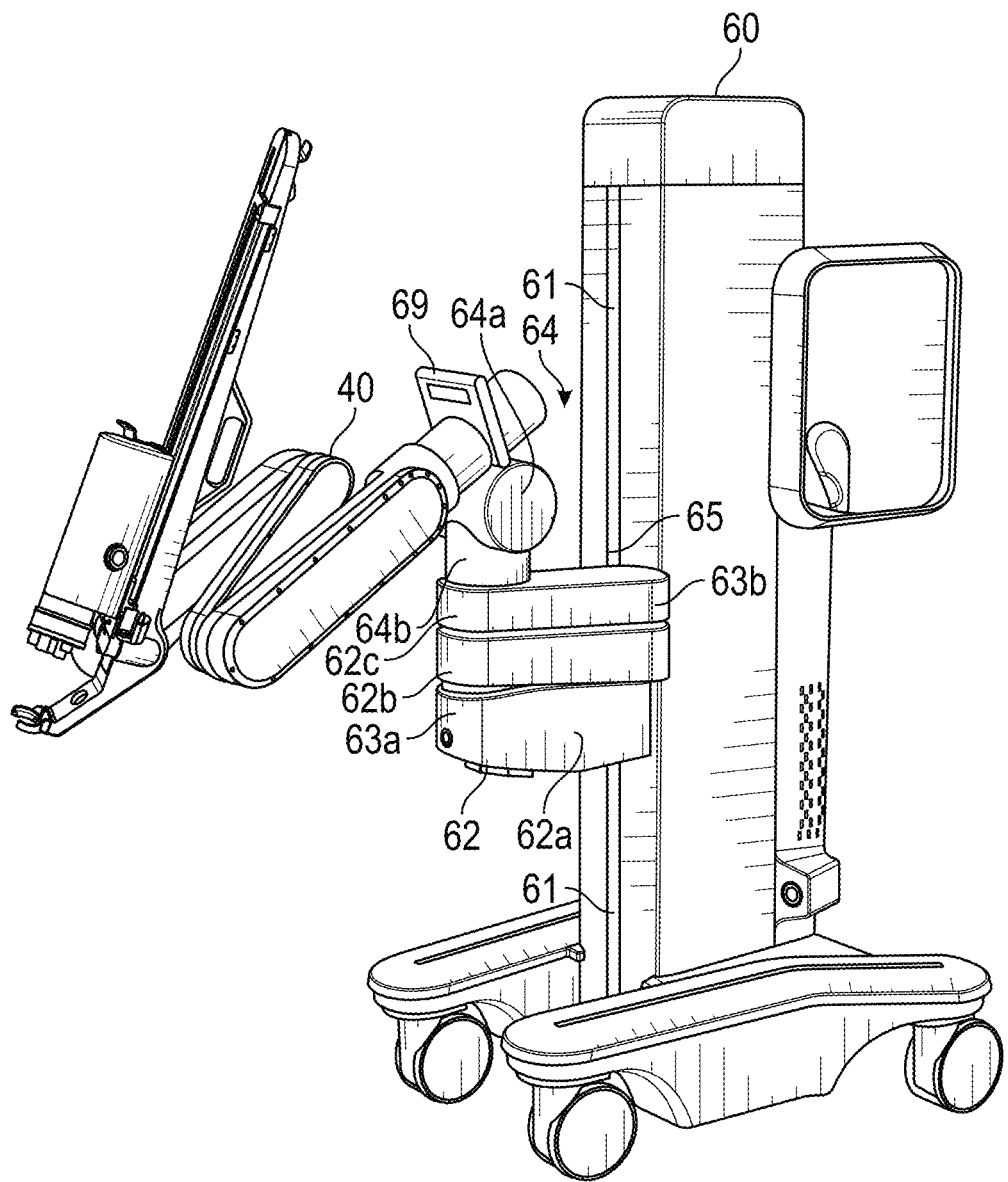
FIG. 3 is a perspective view of a setup arm with the surgical robotic arm of the surgical robotic system of FIG. 1 according to aspects of this disclosure.

With reference to FIG. 2, each of the robotic arms 40 may include a plurality of links 42*a*, 42*b*, 42*c*, which are interconnected at joints 44*a*, 44*b*, 44*c*, respectively. The joint 44*a* is configured to secure the robotic arm 40 to the movable cart 60 and defines a first longitudinal axis. With reference to FIG. 3, the movable cart 60 includes a lift 61 and a setup arm 62, which provides a base for mounting of the robotic arm 40. The lift 61 allows for vertical movement of the setup arm 62. The movable cart 60 also includes a display 69 for displaying information pertaining to the robotic arm 40.

The setup arm 62 includes a first link 62*a*, a second link 62*b*, and a third link 62*c*, which provide for lateral maneuverability of the robotic arm 40. The links 62*a*, 62*b*, 62*c* are interconnected at joints 63*a* and 63*b*, each of which may include an actuator (not shown) for rotating the links 62*b* and 62*b* relative to each other and the link 62*c*. In particular, the links 62*a*, 62*b*, 62*c* are movable in their corresponding lateral planes that are parallel to each other, thereby allowing for extension of the robotic arm 40 relative to the patient (e.g., surgical table). In aspects, the robotic arm 40 may be coupled to the surgical table (not shown). The setup arm 62 includes controls 65 for adjusting movement of the links 62*a*, 62*b*, 62*c* as well as the lift 61.

The third link 62*c* includes a rotatable base 64 having two degrees of freedom. In particular, the rotatable base 64 includes a first actuator 64*a* and a second actuator 64*b*. The first actuator 64*a* is rotatable about a first stationary arm axis which is perpendicular to a plane defined by the third link 62*c* and the second actuator 64*b* is rotatable about a second stationary arm axis which is transverse to the first stationary arm axis. The first and second actuators 64*a* and 64*b* allow for full three-dimensional orientation of the robotic arm 40.

With reference again to FIG. 2, the robotic arm 40 also includes a holder 46 defining a second longitudinal axis and configured to receive an IDU 52 (FIG. 1). The IDU 52 is configured to couple to an actuation mechanism of the surgical instrument 50 and the camera 51 and is configured to move (e.g., rotate) and actuate the instrument 50 and/or the camera 51. IDU 52 transfers actuation forces from its actuators to the surgical instrument 50 to actuate components (e.g., end effectors) of the surgical instrument 50. The holder 46 includes a sliding mechanism 46*a*, which is configured to move the IDU 52 along the second longitudinal axis defined by the holder 46. The holder 46 also includes a joint 46*b*, which rotates the holder 46 relative to the link 42*c*.

The robotic arm 40 also includes a plurality of manual override buttons 53 disposed on the IDU 52 and the setup arm 62, which may be used in a manual mode. The clinician may press one or the buttons 53 to move the component associated with the button 53.

The joints 44*a* and 44*b* include an actuator 48*a* and 48*b* configured to drive the joints 44*a*, 44*b*, 44*c* relative to each other through a series of belts 45*a* and 45*b* or other mechanical linkages such as a drive rod, a cable, or a lever and the like. In particular, the actuator 48*a* is configured to rotate the robotic arm 40 about a longitudinal axis defined by the link 42*a*.

The actuator 48*b* of the joint 44*b* is coupled to the joint 44*c* via the belt 45*a*, and the joint 44*c* is in turn coupled to the joint 46*c* via the belt 45*b*. Joint 44*c* may include a transfer case coupling the belts 45*a* and 45*b*, such that the actuator 48*b* is configured to rotate each of the links 42*b*, 42*c* and the holder 46 relative to each other. More specifically, links 42b, 42c, and the holder 46 are passively coupled to the actuator 48b which enforces rotation about a remote center point "P" which lies at an intersection of the first axis defined by the link 42a and the second axis defined by the holder 46. Thus, the actuator 48b controls the angle "a" between the first and second axes allowing for orientation of the surgical instrument 50. Due to the interlinking of the links 42a, 42b, 42c, and the holder 46 via the belts 45a and 45b, the angles between the links 42a, 42b, 42c, and the holder 46 are also adjusted in order to achieve the desired angle "a." In aspects, some or all of the joints 44a, 44b, 44c may include an actuator to obviate the need for mechanical linkages.

Figure 4:
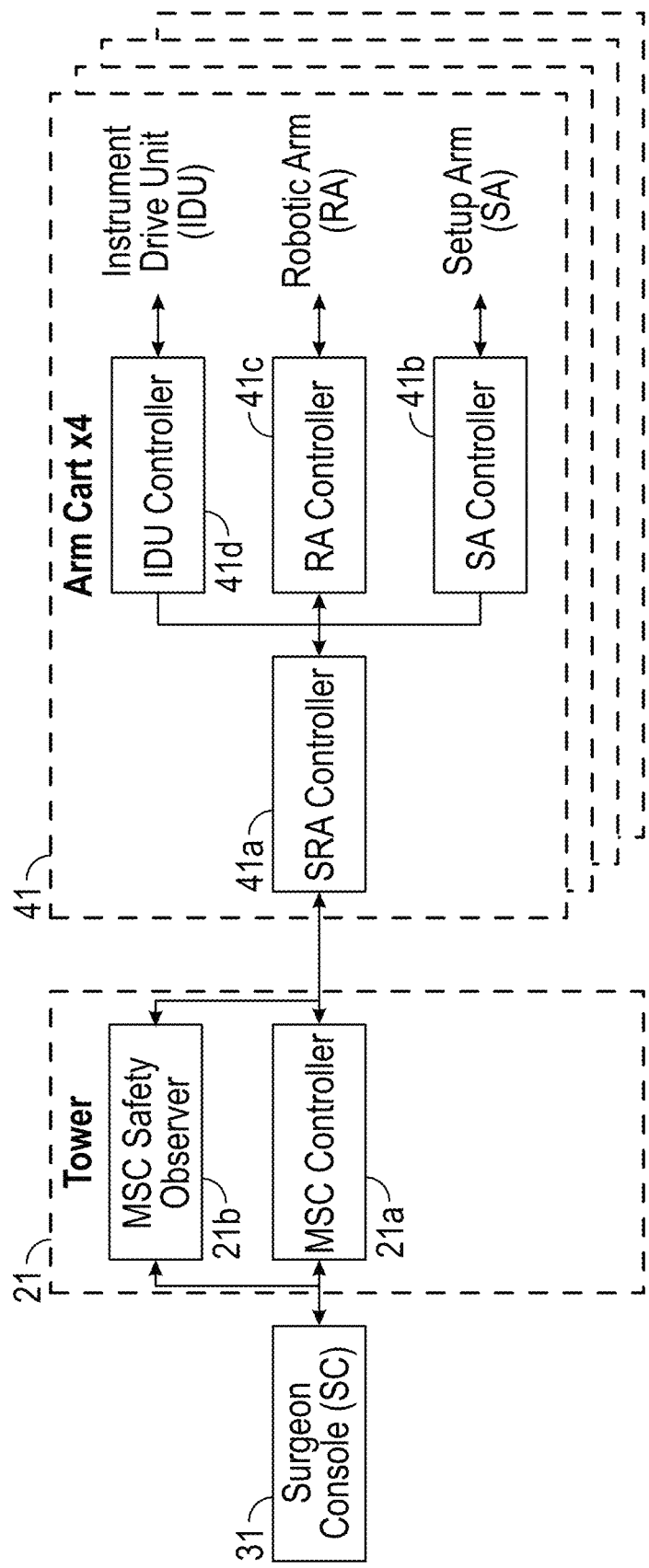
FIG. 4 is a schematic diagram of a computer architecture of the surgical robotic system of FIG. 1 according to aspects of this disclosure.

With reference to FIG. 4, each of the computers 21, 31, 41 of the surgical robotic system 10 may include a plurality of controllers, which may be embodied in hardware and/or software. The computer 21 of the control tower 20 includes a controller 21a and safety observer 21b. The controller 21a receives data from the computer 31 of the surgical console 30 about the current position and/or orientation of the handle controllers 38a and 38b and the state of the foot pedals 36 and other buttons. The controller 21a processes these input positions to determine desired drive commands for each joint of the robotic arm 40 and/or the IDU 52 and communicates these to the computer 41 of the robotic arm 40. The controller 21a also receives back the actual joint angles and uses this information to determine force feedback commands that are transmitted back to the computer 31 of the surgical console 30 to provide haptic feedback through the handle controllers 38a and 38b. The handle controllers 38a and 38b include one or more haptic feedback vibratory devices that output haptic feedback. The safety observer 21b performs validity checks on the data going into and out of the controller 21a and notifies a system fault handler if errors in the data transmission are detected to place the computer 21 and/or the surgical robotic system 10 into a safe state.

The computer 41 includes a plurality of controllers, namely, a main cart controller 41a, a setup arm controller 41b, a robotic arm controller 41c, and an instrument drive unit (IDU) controller 41d. The main cart controller 41a receives and processes joint commands from the controller 21a of the computer 21 and communicates them to the setup arm controller 41b, the robotic arm controller 41c, and the IDU controller 41d. The main cart controller 41a also manages instrument exchanges and the overall state of the movable cart 60, the robotic arm 40, and the IDU 52. The main cart controller 41a also communicates actual joint angles back to the controller 21a.

The setup arm controller 41b controls each of joints 63a and 63b, and the rotatable base 64 of the setup arm 62 and calculates desired motor movement commands (e.g., motor torque) for the pitch axis and controls the brakes. The robotic arm controller 41c controls each joint 44a and 44b of the robotic arm 40 and calculates desired motor torques required for gravity compensation, friction compensation, and closed loop position control of the robotic arm 40. The robotic arm controller 41c calculates a movement command based on the calculated torque. The calculated motor commands are then communicated to one or more of the actuators 48a and 48b in the robotic arm 40. The actual joint positions are then transmitted by the actuators 48a and 48b back to the robotic arm controller 41c.

The IDU controller 41d receives desired joint angles for the surgical instrument 50, such as wrist and jaw angles, and computes desired currents for the motors in the IDU 52. The IDU controller 41d calculates actual angles based on the motor positions and transmits the actual angles back to the main cart controller 41a.

The robotic arm 40 is controlled as follows. Initially, a pose of the handle controller controlling the robotic arm 40, e.g., the handle controller 38a, is transformed into a desired pose of the robotic arm 40 through a hand eye transform function executed by the controller 21a. The hand eye function, as well as other functions described herein, is/are embodied in software executable by the controller 21a or any other suitable controller described herein. The pose of one of the handle controller 38a may be embodied as a coordinate position and role-pitch-yaw ("RPY") orientation relative to a coordinate reference frame, which is fixed to the surgical console 30. The desired pose of the instrument 50 is relative to a fixed frame on the robotic arm 40. The pose of the handle controller 38a is then scaled by a scaling function executed by the controller 21a. In aspects, the coordinate position is scaled down and the orientation is scaled up by the scaling function. In addition, the controller 21a also executes a clutching function, which disengages the handle controller 38a from the robotic arm 40. In particular, the controller 21a stops transmitting movement commands from the handle controller 38a to the robotic arm 40 if certain movement limits or other thresholds are exceeded and in essence acts like a virtual clutch mechanism, e.g., limits mechanical input from effecting mechanical output.

The desired pose of the robotic arm 40 is based on the pose of the handle controller 38a and is then passed by an inverse kinematics function executed by the controller 21a. The inverse kinematics function calculates angles for the joints 44a, 44b, 44c of the robotic arm 40 that achieve the scaled and adjusted pose input by the handle controller 38a. The calculated angles are then passed to the robotic arm controller 41c, which includes a joint axis controller having a proportional-derivative (PD) controller, the friction estimator module, the gravity compensator module, and a two-sided saturation block, which is configured to limit the commanded torque of the motors of the joints 44a, 44b, 44c.

Figure 5:
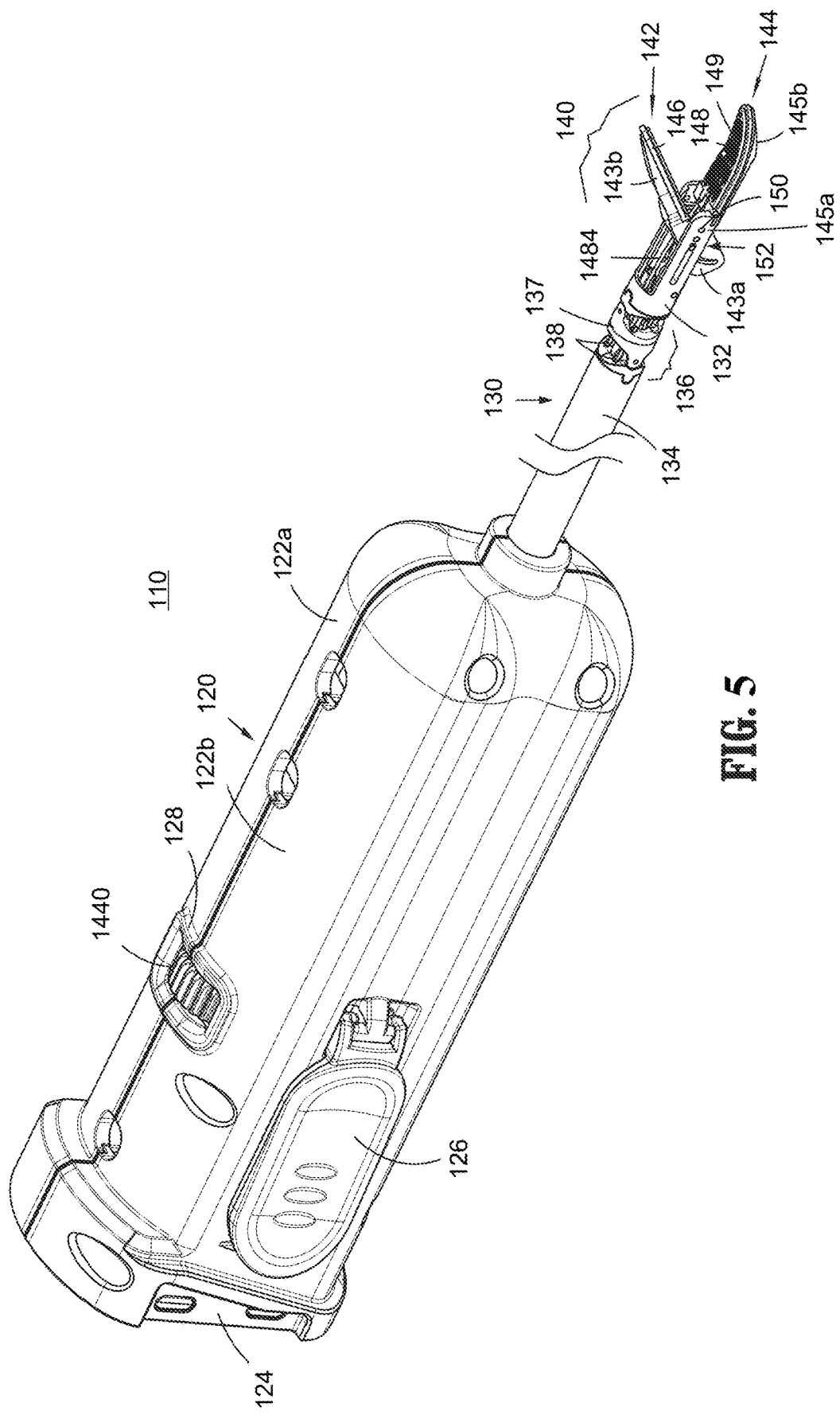
FIG. 5 is a perspective view of a surgical instrument provided in accordance with the present disclosure configured for mounting on a robotic arm of a surgical robotic system such as the surgical robotic system of FIG. 1.
Figure 6A:
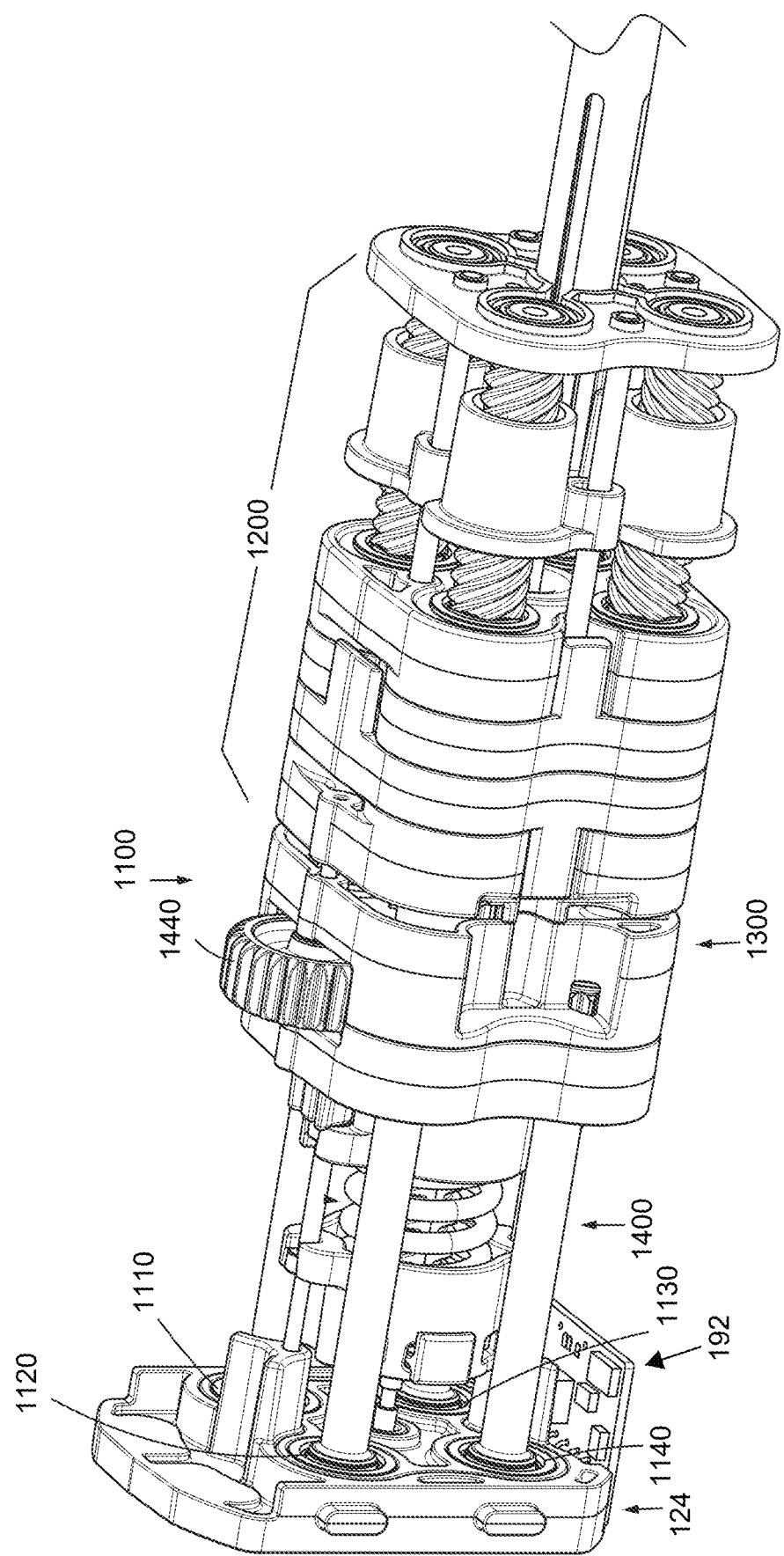
FIGS. 6A and 6B are front and rear perspective views, respectively, of a proximal portion of the surgical instrument of FIG. 5, with an outer shell removed.
Figure 6B:
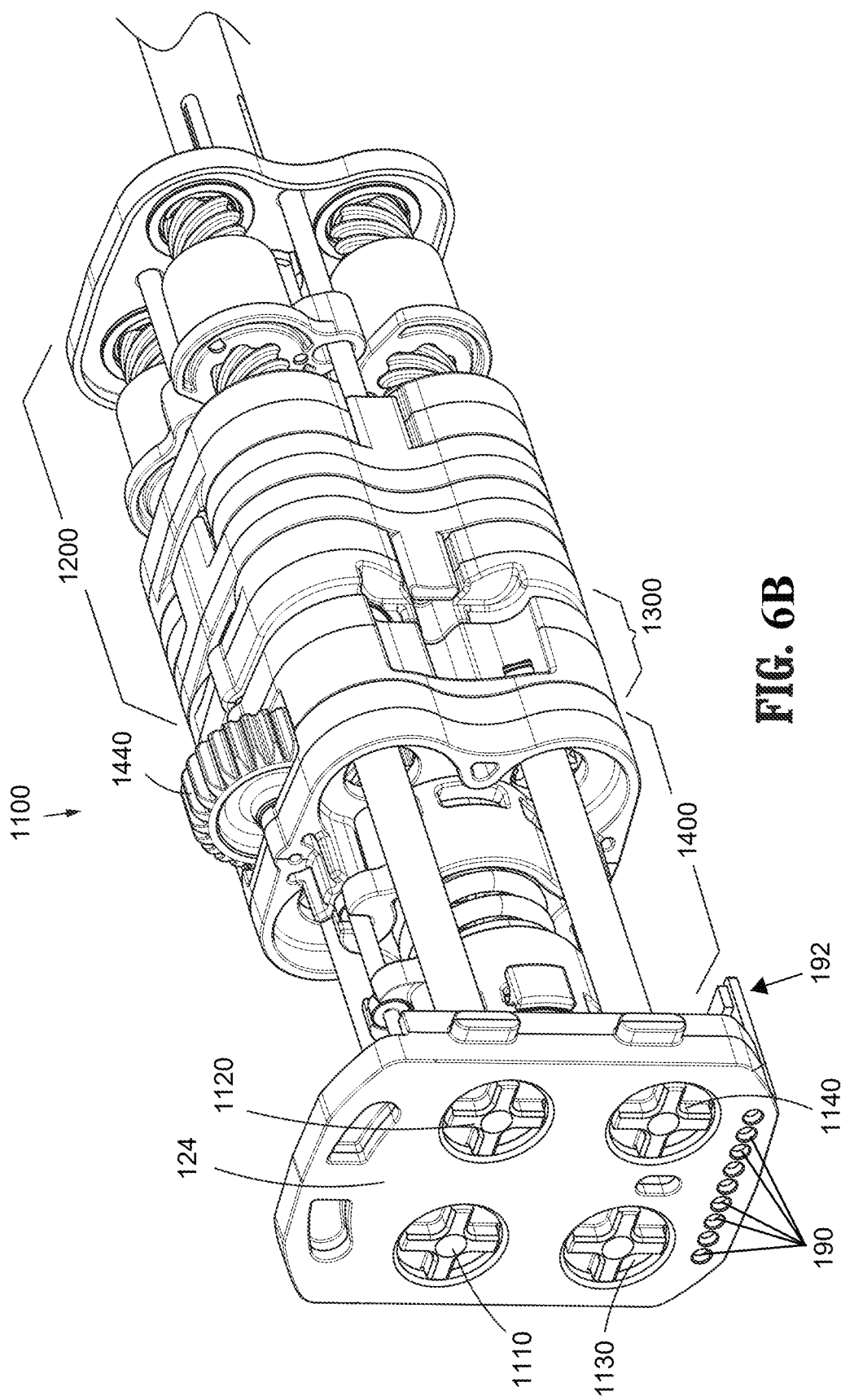
Figure 7:
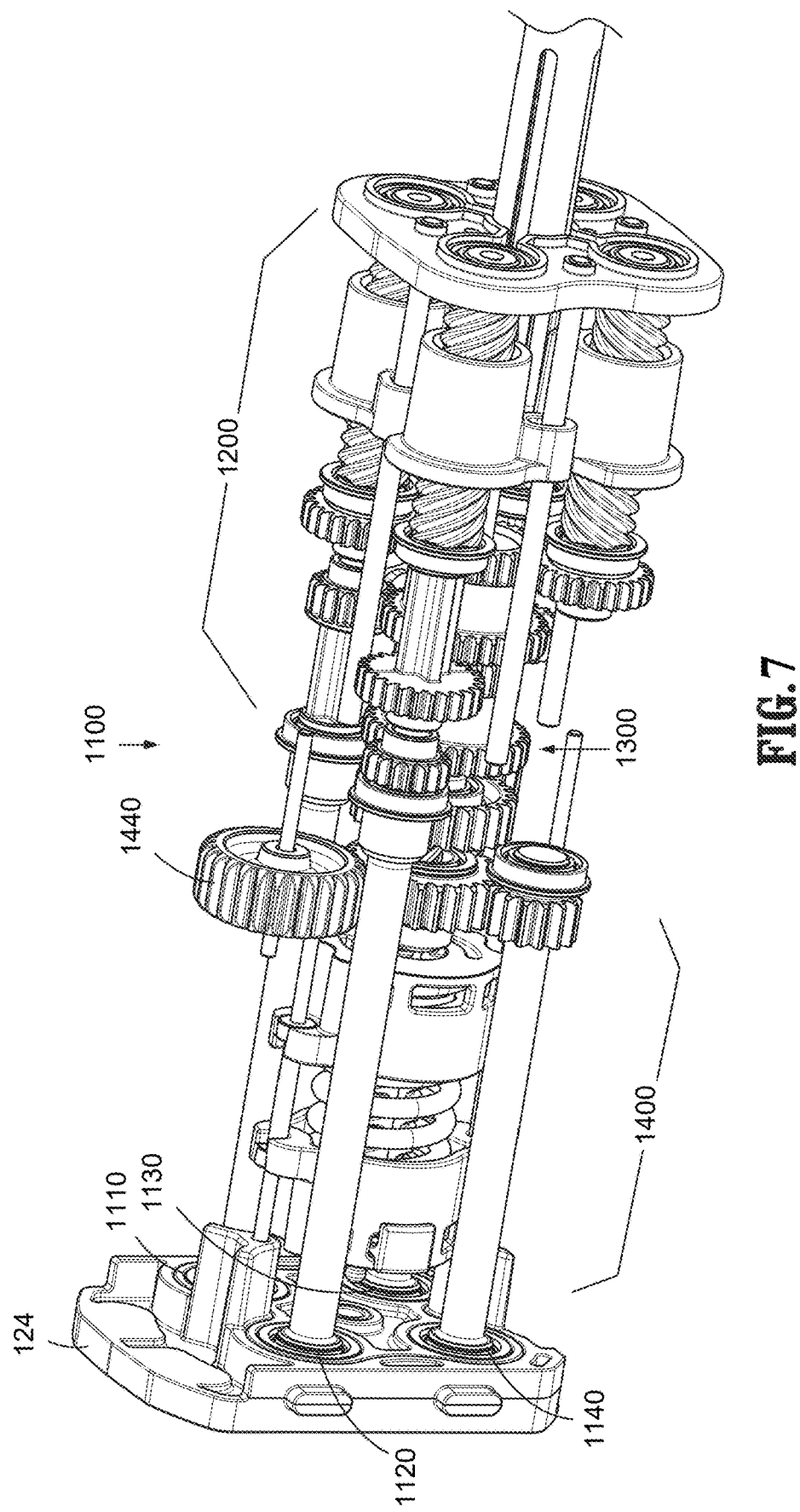
FIG. 7 is a front perspective view of the proximal portion of the surgical instrument of FIG. 5 with the outer shell and additional internal components removed.

Turning to FIGS. 5-7, a surgical instrument 110 provided in accordance with the present disclosure generally includes a housing 120, a shaft 130 extending distally from housing 120, an end effector assembly 140 extending distally from shaft 130, and an actuation assembly 1100 disposed within housing 120 and operably associated with end effector assembly 140. Instrument 110 is detailed herein as an articulating electrosurgical forceps configured for use with a surgical robotic system, e.g., surgical robotic system 10 (FIG. 1). However, the aspects and features of instrument 110 provided in accordance with the present disclosure, detailed below, are equally applicable for use with other suitable surgical instruments, e.g., graspers, staplers, clip appliers, and/or in other suitable surgical systems, e.g., motorized, other power-driven systems, and/or manually-actuated surgical systems (including handheld instruments).

With particular reference to FIG. 5, housing 120 of instrument 110 includes first and second body portion 122a, 122b and a proximal face plate 124 that cooperate to enclose actuation assembly 1100 therein. Proximal face plate 124 includes through holes defined therein through which input couplers 1110-1140 (FIG. 6B) of actuation assembly 1100 extend. A pair of latch levers 126 (only one of which is illustrated in FIG. 5) extending outwardly from opposing sides of housing 120 enable releasable engagement of housing 120 with a robotic arm of a surgical robotic system, e.g., surgical robotic system 10 (FIG. 1). A window 128 defined through housing 120 permits thumbwheel 1440 to extend therethrough to enable manual manipulation of thumbwheel 1440 from the exterior of housing 120 to permit manual opening and closing of end effector assembly 140.

Referring also to FIGS. 6A-7, a plurality of electrical contacts 190 extend through one or more apertures defined through proximal face plate 124 to enable electrical communication between instrument 110 and surgical robotic system 10 (FIG. 1) when instrument 110 is engaged on a robotic arm thereof, e.g., for the communication of data, control, and/or power signals therebetween. As an alternative to electrical contacts 190 extending through proximal face plate 124, other suitable transmitter, receiver, and/or transceiver components to enable the communication of data, control, and/or power signals are also contemplated, e.g., using RFID, Bluetooth®, WiFi®, or via any other suitable wired, wireless, contacted, or contactless communication method. At least some of the electrical contacts 190 are electrically coupled with electronics 192 mounted on an interior side of proximal face plate 124, e.g., within housing 120. Electronics 192 may include, for example, a storage device, a communications device (including suitable input/output components), and a CPU including a memory and a processor. Electronics 192 may be mounted on a circuit board or otherwise configured, e.g., as a chip.

The storage device of electronics 192 stores information relating to surgical instrument such as, for example: the item number, e.g., SKU number; date of manufacture; manufacture location, e.g., location code; serial number; lot number; use information; setting information; adjustment information; calibration information; security information, e.g., encryption key(s), and/or other suitable additional or alternative data. The storage device of electronics 192 may be, for example, a magnetic disk, flash memory, optical disk, or other suitable data storage device.

As an alternative or in addition to storing the above noted information in the storage device of electronics 192, some or all of such information, e.g., the use information, calibration information, setting information, and/or adjustment information, may be stored in a storage device associated with surgical robotic system 10 (FIG. 1), a remote server, a cloud server, etc., and accessible via instrument 110 and/or surgical robotic system 10 (FIG. 1). In such configurations, the information may, for example, be updated by manufacturer provided updates, and/or may be applied to individual instruments, units of instruments (e.g., units from the same manufacturing location, manufacturing period, lot number, etc.), or across all instruments. Further still, even where the information is stored locally on each instrument, this information may be updated by manufacturer provided updates manually or automatically upon connection to the surgical robotic system 10 (FIG. 1).

Referring again to FIG. 5, shaft 130 of instrument 110 includes a distal segment 132, a proximal segment 134, and an articulating section 136 disposed between the distal and proximal segments 132, 134, respectively. Articulating section 136 includes one or more articulating components 137, e.g., links, joints, etc. A plurality of articulation cables 138, e.g., four (4) articulation cables, or other suitable actuators, extend through articulating section 136. More specifically, articulation cables 138 are operably coupled to distal segment 132 of shaft 130 at the distal ends thereof and extend proximally from distal segment 132 of shaft 130, through articulating section 136 of shaft 130 and proximal segment 134 of shaft 130, and into housing 120, wherein articulation cables 138 operably couple with an articulation sub-assembly 1200 of actuation assembly 1100 (FIG. 6A) to enable selective articulation of distal segment 132 (and, thus end effector assembly 140) relative to proximal segment 134 and housing 120, e.g., about at least two axes of articulation (yaw and pitch articulation, for example). Articulation cables 138 are arranged in a generally rectangular configuration, although other suitable configurations are also contemplated. In some configurations, as an alternative, shaft 130 is substantially rigid, malleable, or flexible and not configured for active articulation. Articulation sub-assembly 1200 is described in greater detail below.

With respect to articulation of end effector assembly 140 relative to proximal segment 134 of shaft 130, actuation of articulation cables 138 may be accomplished in pairs. More specifically, in order to pitch end effector assembly 140, the upper pair of cables 138 are actuated in a similar manner while the lower pair of cables 138 are actuated in a similar manner relative to one another but an opposite manner relative to the upper pair of cables 138. With respect to yaw articulation, the right pair of cables 138 are actuated in a similar manner while the left pair of cables 138 are actuated in a similar manner relative to one another but an opposite manner relative to the right pair of cables 138. Other configurations of articulation cables 138 or other articulation actuators are also contemplated.

Continuing with reference to FIG. 5, end effector assembly 140 includes first and second jaw members 142, 144, respectively. Each jaw member 142, 144 includes a proximal flange portion 143a, 145a and a distal body portion 143b, 145b, respectively. Distal body portions 143b, 145b define opposed tissue contacting surfaces 146, 148, respectively. Proximal flange portions 143a, 145a are pivotably coupled to one another about a pivot 150 and are operably coupled to one another via a cam slot assembly 152 including a cam pin slidably received within cam slots defined within the proximal flange portion 143a, 145a of at least one of the jaw members 142, 144, respectively, to enable pivoting of jaw member 142 relative to jaw member 144 and distal segment 132 of shaft 130 between a spaced apart position (e.g., an open position of end effector assembly 140) and an approximated position (e.g., a closed position of end effector assembly 140) for grasping tissue between tissue contacting surfaces 146, 148. As an alternative to this unilateral configuration, a bilateral configuration may be provided whereby both jaw members 142, 144 are pivotable relative to one another and distal segment 132 of shaft 130. Other suitable jaw actuation mechanisms are also contemplated.

In configurations, a longitudinally extending knife channel 149 (only knife channel 149 of jaw member 144 is illustrated; the knife channel of jaw member 142 is similarly configured) is defined through the tissue contacting surface 146, 148 of one or both jaw members 142, 144. In such aspects, a knife assembly including a knife rod (not shown) extending from housing 120 through shaft 130 to end effector assembly 140 and a knife blade (not shown) disposed within end effector assembly 140 between jaw members 142, 144 is provided. The knife blade is selectively translatable through the knife channel(s) 149 and between the jaw member 142, 144 to cut tissue grasped between tissue contacting surfaces 146, 148 of jaw members 142, 144, respectively. The knife rod is operably coupled to a knife drive sub-assembly 1300 (FIG. 7) of actuation assembly 1100 (FIGS. 6A-6B) at a proximal end thereof to enable the selective actuation of the knife rod to, in turn, reciprocate the knife blade (not shown) between jaw members 142, 144 to cut tissue grasped between tissue contacting surfaces 146, 148. As an alternative to a longitudinally advanceable mechanical knife, other suitable mechanical cutters are also contemplated, e.g., guillotine style cutters, as are energy based cutters, e.g., RF electrical cutters, ultrasonic cutters, etc., in static or dynamic configurations.

Referring still to FIG. 5, a drive rod 1484 is operably coupled to cam slot assembly 152 of end effector assembly 140, e.g., engaged with the cam pin thereof, such that longitudinal actuation of drive rod 1484 pivots jaw member 142 relative to jaw member 144 between the spaced apart and approximated positions. More specifically, urging drive rod 1484 proximally pivots jaw member 142 relative to jaw member 144 towards the approximated position while urging drive rod 1484 distally pivots jaw member 142 relative to jaw member 144 towards the spaced apart position. However, other suitable mechanisms and/or configurations for pivoting jaw member 142 relative to jaw member 144 between the spaced apart and approximated positions in response to selective actuation of drive rod 1484 are also contemplated. Drive rod 1484 extends proximally from end effector assembly 140 through shaft 130 and into housing 120 wherein drive rod 1484 is operably coupled with a jaw drive sub-assembly 1400 of actuation assembly 1100 (FIGS. 6A-6B) to enable selective actuation of end effector assembly 140 to grasp tissue therebetween and apply a jaw force within an appropriate jaw force range.

Tissue contacting surfaces 146, 148 of jaw members 142, 144, respectively, are at least partially formed from an electrically conductive material and are energizable to different potentials to enable the conduction of RF electrical energy through tissue grasped therebetween, although tissue contacting surfaces 146, 148 may alternatively be configured to supply any suitable energy, e.g., thermal, microwave, light, ultrasonic, ultrasound, etc., through tissue grasped therebetween for energy based tissue treatment. Instrument 110 defines a conductive pathway (not shown) through housing 120 and shaft 130 to end effector assembly 140 that may include lead wires, contacts, and/or electrically conductive components to enable electrical connection of tissue contacting surfaces 146, 148 of jaw members 142, 144, respectively, to an energy source (not shown), e.g., an electrosurgical generator, for supplying energy to tissue contacting surfaces 146, 148 to treat, e.g., seal, tissue grasped between tissue contacting surfaces 146, 148.

With additional reference to FIGS. 6A-7, as noted above, actuation assembly 1100 is disposed within housing 120 and includes an articulation sub-assembly 1200, a knife drive sub-assembly 1300, and a jaw drive sub-assembly 1400. Articulation sub-assembly 1200 is operably coupled between first and second input couplers 1110, 1120, respectively, of actuation assembly 1100 and articulation cables 138 (FIG. 5) such that, upon receipt of appropriate inputs into first and/or second input couplers 1110, 1120, articulation sub-assembly 1200 manipulates cables 138 (FIG. 5) to articulate end effector assembly 140 in a desired direction, e.g., to pitch and/or yaw end effector assembly 140. Articulation sub-assembly 1200 is described in greater detail below.

Knife drive sub-assembly 1300 is operably coupled between third input coupler 1130 of actuation assembly 1100 and the knife rod such that, upon receipt of appropriate input into third input coupler 1130, knife drive sub-assembly 1300 manipulates the knife rod to reciprocate the knife blade between jaw members 142, 144 to cut tissue grasped between tissue contacting surfaces 146, 148.

Jaw drive sub-assembly 1400 is operably coupled between fourth input coupler 1140 of actuation assembly 1100 and drive rod 1484 such that, upon receipt of appropriate input into fourth input coupler 1140, jaw drive sub-assembly 1400 pivots jaw members 142, 144 between the spaced apart and approximated positions to grasp tissue therebetween and apply a jaw force within an appropriate jaw force range.

Actuation assembly 1100 is configured to operably interface with a surgical robotic system, e.g., system 10 (FIG. 1), when instrument 110 is mounted on a robotic arm thereof, to enable robotic operation of actuation assembly 1100 to provide the above detailed functionality. That is, surgical robotic system 10 (FIG. 1) selectively provides inputs, e.g., rotational inputs to input couplers 1110-1140 of actuation assembly 1100 to articulate end effector assembly 140, grasp tissue between jaw members 142, 144, and/or cut tissue grasped between jaw members 142, 144. However, as noted above, it is also contemplated that actuation assembly 1100 be configured to interface with any other suitable surgical systems, e.g., a manual surgical handle, a powered surgical handle, etc.

Figure 8:
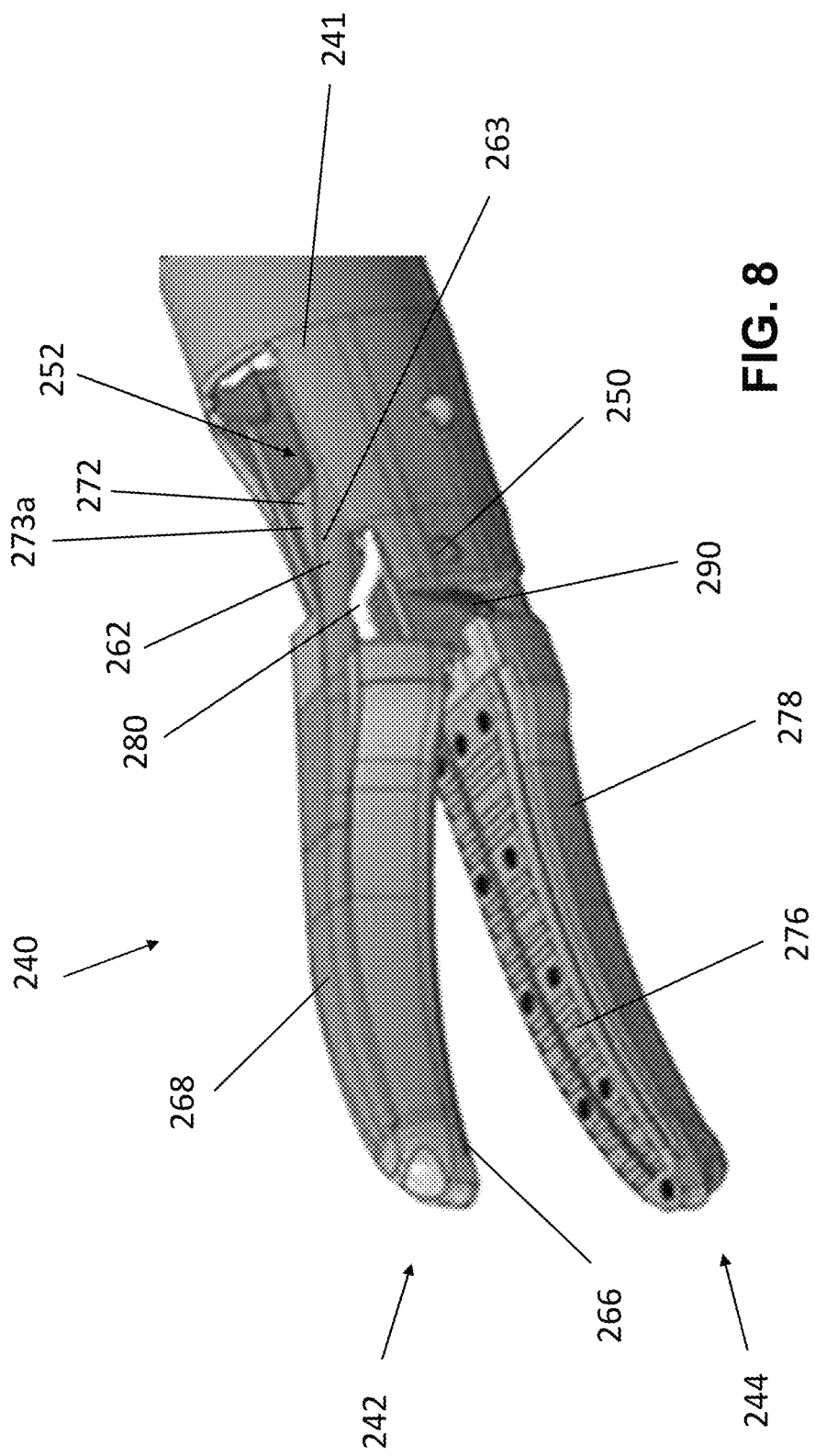
FIG. 8 is a perspective view of another end effector assembly provided in accordance with this disclosure configured for use with the surgical instrument of FIG. 5 or any other suitable surgical instrument.
Figure 11A:
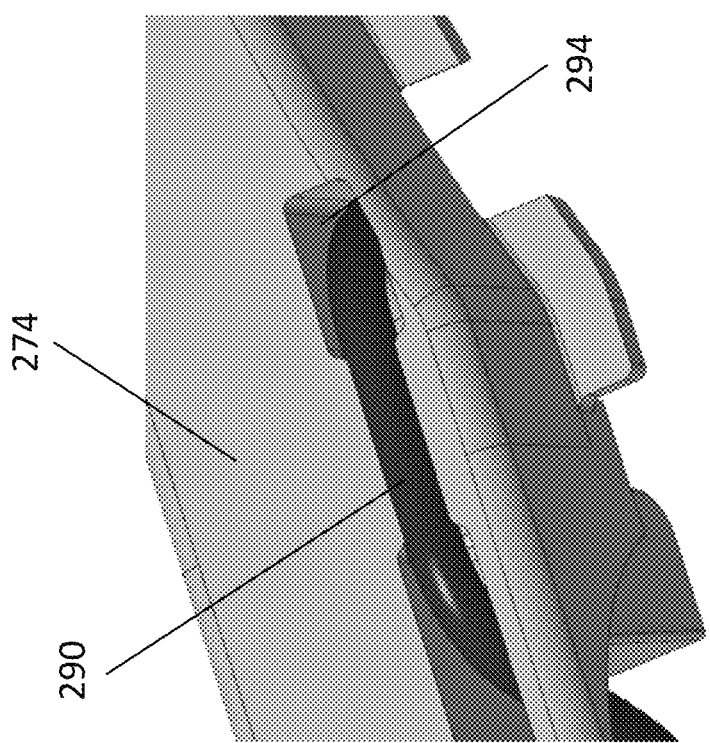
FIGS. 11A and 11B are bottom, perspective views of the insulative spacer of one of the jaw members of the end effector assembly of FIG. 8 without and with an electrical lead wire, respectively.
Figure 11B:
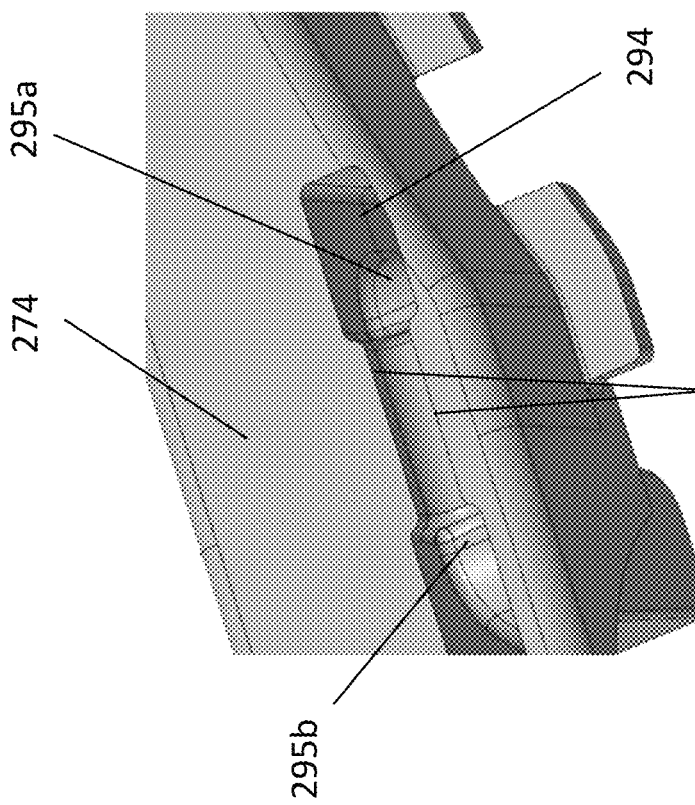

Turning to FIGS. 8 and 9, another end effector assembly provided in accordance with the present disclosure and configured for use with surgical instrument 110 (FIG. 5) or any other suitable surgical instrument is shown generally identified by reference numeral 240. End effector assembly 240 is similar to and may include any of the features of end effector assembly 140 (FIG. 5), and/or may be utilized as part of surgical instrument 110 (FIGS. 5-7) similarly as described above with respect to end effector assembly 140 (FIG. 5), except as explicitly contradicted below.

End effector assembly 240 includes a clevis 241 joined to or forming distal segment 132 of shaft 130 of instrument 110 (see FIG. 5) and first and second jaw members 242, 244, respectively, operably coupled to clevis 241. More specifically, first jaw member 242 is pivotably coupled to clevis 241 and second jaw member 244, while second jaw member 244 is fixed relative to clevis 241. Each jaw member 242, 244 includes a structural frame 262, 272, an insulative spacer 274 (only insulative spacer 274 of jaw member 244 is shown, the insulative spacer of jaw member 242 may be similar except without tissue stop 279), an electrically conductive tissue contacting plate 266, 276, and an outer housing 268, 278. Each structural frame 262, 272 includes a proximal flange portion 263, 273a and a distal body portion 273b (only distal body portion 273b of jaw member 244 is shown, the distal body portion of the structural frame 262 of member 242 may be similar). Distal body portions 273b support insulative spacers 274 thereon which, in turn, support electrically conductive tissue contacting plates 266, 276.

Outer housings 268, 278 may be formed by overmolding or in any other suitable manner and serve to capture and secure the components of the respective jaw members 242, 244, e.g., structural frames 262, 272, insulative spacers 274, and electrically conductive tissue contacting plate 266, 276, relative to one another. Outer housings 268, 278 may cover portions or the entireties of the bottoms and/or sides of jaw members 242, 244. Although referred to herein as outer housings 268, 278, the overmold or other material forming outer housings 268, 278 may additionally or alternatively penetrate around and/or between the internal components of the respective jaw members 242, 244 to facilitate the capture and securement of the jaw member components with one another. Further, where outer housings 268, 278 are overmolded, a single or multi-shot overmolding process may be utilized.

Proximal flange portions 263, 273a of jaw members 242, 244 are pivotably coupled to one another about a pivot 250 (which may be a single pin, split pin, multiple pins, or other pivot structure extending through apertures 251 defined within proximal flange portions 263, 273a), and are operably coupled to one another via a cam assembly 252 (such as, for example including a cam pin slidably received within cam slots defined within the proximal flange portion 263, 273a of at least one of the jaw members 242, 244, respectively) to enable pivoting of jaw member 242 relative to jaw member 244 and clevis 241 between a spaced apart position (e.g., an open position of end effector assembly 240) and an approximated position (e.g., a closed position of end effector assembly 240) for grasping tissue between electrically conductive tissue contacting plates 266, 276. As an alternative to this unilateral configuration, a bilateral configuration may be provided whereby both jaw members 242, 244 are pivotable relative to one another and clevis 241. Any suitable jaw actuation mechanism such as, for example, using a push-pull drive bar as detailed above, may be utilized to actuate jaw member(s) 242, 244.

Electrically conductive tissue contacting plates 266, 276 of jaw members 242, 244, respectively, are at least partially formed from an electrically conductive material and are energizable to different potentials to enable the conduction of RF electrical energy through tissue grasped therebetween, although electrically conductive tissue contacting plates 266, 276 may alternatively be configured to supply any suitable energy, e.g., thermal, microwave, light, ultrasonic, ultrasound, etc., through tissue grasped therebetween for energy based tissue treatment. In order to enable the conduction of energy to and from electrically conductive tissue contacting plates 266, 276, electrical lead wires 280, 290 are provided that electrically connect to the undersides of electrically conductive tissue contacting plates 266, 276 within jaw members 242, 244, respectively. Electrical lead wires 280, 290 and/or other suitable electrical conductors connected thereto, define isolated electrical pathways from jaw members 242, 244 through clevis 241, shaft 130 of instrument 110, and into housing 120 (see FIG. 5) for ultimate connection to an energy source (not shown), e.g., an electrosurgical generator, to enable the supply of energy to electrically conductive tissue contacting plates 266, 276 to treat, e.g., seal, tissue grasped therebetween. Electrical lead wires 280, 290 and/or other suitable electrical conductors connected thereto may extend from housing 120 (see FIG. 5) through an electrosurgical cable (not shown) for connection to the energy source. Alternatively, the energy source may be disposed on or within housing 120 or otherwise in direct or indirect contact therewith, e.g., via a robot arm 40 (FIG. 1).

Referring to FIGS. 9-12B, the configuration of jaw member 244 and, more specifically, the coupling of lead wire 290 to electrically conductive tissue contacting plate 276 and routing of the same proximally through jaw member 244 is described, as is the method of manufacture thereof. Although described with respect to jaw member 244, it is contemplated that jaw member 242 (FIG. 8) may be configured and/or manufactured in the same or a similar manner.

As noted above, distal body portion 273b of structural frame 272 of jaw member 244 supports insulative spacer 274 thereon which, in turn, support electrically conductive tissue contacting plate 276 thereon. Lead wire 290 is secured, e.g., soldered or otherwise attached, to the underside of electrically conductive tissue contacting plate 276 towards the proximal end thereof or at any other suitable position therealong. Lead wire 290 may be insulated except for exposed free end 291 that is attached to electrically conductive tissue contacting plate 276. Lead wire 290 may be attached to electrically conductive tissue contacting plate 276 with the exposed free end 291 of lead wire 290 in a substantially proximally facing direction. As such, lead wire 290 extends from the attachment point with electrically conductive tissue contacting plate 276 substantially distally.

Insulative spacer 274 defines an upper pocket 292 that provides clearance between insulative spacer 272 and electrically conductive tissue contacting plate 276 for lead wire 290 and, more specifically, the exposed free end 291 thereof that is attached to the underside of electrically conductive tissue contacting plate 276. Insulative spacer 274 further defines a channel 294 extending from upper pocket 292 through insulative spacer 274 and around a bottom thereof for receipt of lead wire 290. In this manner, channel 294 defines a substantially U-shaped configuration with radiused corners 295a, 295b at the bottom of insulative spacer 274. Radiused corner 295a facilitates the substantially 180 degree transition of lead wire 290 from substantially distally facing to substantially proximally facing to enable routing of lead wire 290 proximally from jaw member 244. Radiused corner 295b, on the other hand, facilitates routing lead wire 290 from the bottom of insulative spacer 274 to traverse pivot aperture 251 defined through proximal flange portion 273a of structural frame 272, e.g., to extend from a lower side of pivot aperture 251 upwardly and over pivot aperture 251 (or vice versa).

Continuing with reference to FIGS. 9-12B, the segment of channel 294 extending along the bottom of insulative spacer 274 and between radiused corners 295a, 295b may be substantially linear and include interference-fit features, e.g., inwardly protruding tabs 296, to facilitate retention of lead wire 290 thereof, e.g., via press-fitting of lead wire 290 therein. Further, the free space of upper pocket 292 and/or the portion of channel 294 proximally of radiused corners 295a may be filled with overmold material upon overmolding of outer housing 278 about structural frame 272, insulative spacer 274, and electrically conductive tissue contacting plate 276 to capture and secure the components of jaw member 244 (including lead wire 290) to one another. The interference fit of lead wire 290 between tabs 296 in the above-mentioned portion of channel 294 inhibits the flow of overmold proximally beyond radiused corner 295a. Further, insulative spacer 274, with lead wire 290 engaged therein, is configured such that, upon overmolding, the relatively larger void of upper pocket 292 is first filled with the mold material, followed by a relatively smaller void defined between channel 294 and lead wire 290 adjacent upper pocket 292, and thereafter by a relatively larger void defined between channel 294 and lead wire 290 on the bottom of insulative spacer 274. This filling of a larger void, followed by a smaller void, and then again a larger void facilitates overmolding and inhibits overflow.

Referring to FIGS. 12A and 12B, during manufacture, the portion of lead wire 290 that extends proximally from insulative spacer 274, e.g., proximally of radiused corner 295b, may be pulled and retained in a straight, longitudinally-extending direction for the overmolding, as shown in FIG. 12A, thus ensuring proper overmolding and positioning of lead wire 290. Once the overmolding is complete, since the molded material is contained to the area distally of and including radiused corner 295a, lead wire 290 can then be routed around radiused corner 295b and over pivot aperture 251 defined within structural frame 272 for proximal travel back through the surgical instrument 110 (see FIG. 5). Radiused corner 295b may define a different radius, e.g., a relatively larger radius (or relatively smaller radius), as compared to radiused corner 295a and/or may further include an undercut to facilitate the manipulation of lead wire 290 to traverse pivot aperture 251 (e.g., to extend from below to up and over pivot aperture (or vice versa)) after overmolding and without damaging lead wire 290. Further, the strain relief provided by the above-detailed configurations facilitates use in an articulating surgical instrument such as that detailed above by inhibiting disconnection of lead wire 290 despite tensioning and de-tensioning thereof during articulation.

Turning back to FIG. 9, insulative spacer 274 may include a proximal tissue stop 279 that protrudes upwardly from electrically conductive tissue contacting plate 276 to prevent tissue from extending proximally into proximal flange portion 273a of structural frame 272 of jaw member 244. The proximally-facing wall of proximal tissue stop 279 of insulative spacer 274 may define radiused corner 295b at the bottom end thereof.

While several aspects of this disclosure have been shown in the drawings, it is not intended that this disclosure be limited thereto, as it is intended that the disclosure be as broad in scope as the art will allow and that the specification be read likewise. Therefore, the above description should not be construed as limiting, but merely as exemplifications of particular aspects. Those skilled in the art will envision other modifications within the scope and spirit of the claims appended hereto.

What is claimed is:

1. A jaw member of a surgical instrument, comprising:
   a structural frame;
   an insulative spacer supported on the structural frame, the insulative spacer defining a pocket at an upper portion thereof and including a channel extending from the pocket, through the insulative spacer, to a bottom portion of the insulative spacer, the channel defining a substantially U-shaped configuration having first and second radiused corners at the bottom portion of the insulative spacer;
   an electrically conductive tissue contacting plate supported on the insulative spacer; and
   a lead wire attached to an underside of the electrically conductive tissue contacting plate at an attachment point within the pocket, the lead wire extending from the attachment point into the channel, through the channel, around the first and second radiused corners, and proximally from the jaw member,
   wherein the lead wire is adapted to connect to a source of energy to energize the electrically conductive tissue contacting plate for treating tissue.

2. The jaw member according to claim 1, further comprising an overmold material filling the pocket and a portion of the channel.

3. The jaw member according to claim 2, wherein the overmold material fills the pocket and the portion of the channel distal of the first radiused corner of the channel.

4. The jaw member according to claim 3, wherein the lead wire is interference fit within the channel proximally of the first radiused corner of the channel such that the overmold material is inhibited from flowing proximally beyond the first radiused corner.

5. The jaw member according to claim 2, wherein the overmold material further surrounds at least a portion of the jaw member to define an outer housing thereof.

6. The jaw member according to claim 1, wherein the structural frame includes a proximal flange portion and a distal body portion, the distal body portion supporting the insulative spacer thereon.

7. The jaw member according to claim 6, wherein the proximal flange portion defines a pivot aperture for pivotably coupling the jaw member to another jaw member.

8. The jaw member according to claim 7, wherein the lead wire is routed from the second radiused corner of the channel of the insulative spacer to traverse the pivot aperture of the proximal flange portion.

9. The jaw member according to claim 1, wherein a portion of the insulative spacer extends beyond the electrically conductive tissue contacting surface at a proximal end thereof to define a proximal tissue stop.

10. The jaw member according to claim 9, wherein a proximally-facing wall of the proximal tissue stop includes the second radiused corner of the channel.

11. An end effector assembly of a surgical instrument, comprising:
    a clevis;
    a fixed jaw member fixed relative to the clevis; and
    a pivotable jaw member pivotable relative to the fixed jaw member and the clevis,
    wherein the fixed jaw member includes:
      a structural frame;
      an insulative spacer supported on the structural frame, the insulative spacer including a channel extending from an upper portion of the insulative spacer, through the insulative spacer, to a bottom portion of the insulative spacer, the channel having first and second radiused corners at the bottom portion of the insulative spacer;
      an electrically conductive tissue contacting plate supported on the insulative spacer; and
      a lead wire attached to an underside of the electrically conductive tissue contacting plate at an attachment point, the lead wire extending from the attachment point into the channel, through the channel, around the first and second radiused corners, and proximally into the clevis, and
    wherein the pivotable jaw member includes an electrically conductive tissue contacting plate and a lead wire connected thereto, and wherein the lead wires are adapted to connect to a source of energy to conduct energy between the electrically conductive tissue contacting plates of the fixed and pivotable jaw members and through tissue grasped therebetween for treating tissue.

12. The end effector assembly according to claim 11, further comprising an overmold material filling a portion of the channel.

13. The end effector assembly according to claim 12, wherein the overmold material fills the portion of the channel distal of the first radiused corner of the channel.

14. The end effector assembly according to claim 12, wherein the overmold material further surrounds at least a portion of the fixed jaw member to define an outer housing thereof.

15. The end effector assembly according to claim 11, wherein the structural frame includes a proximal flange portion and a distal body portion, the distal body portion supporting the insulative spacer thereon.

16. The end effector assembly according to claim 15, wherein the proximal flange portion defines a pivot aperture for pivotably coupling the fixed jaw member to the pivotable jaw member via a pivot pin.

17. The end effector assembly according to claim 16, wherein the lead wire of the fixed jaw member is routed from the second radiused corner of the channel of the insulative spacer above to traverse the pivot pin and extend proximally through the clevis.

18. The end effector assembly according to claim 11, wherein the clevis forms part of or is attached to a distal portion of a shaft, the shaft having an articulating portion to enable articulation of the end effector assembly relative to a proximal portion of the shaft.

19. A method of manufacturing a jaw member of a surgical instrument, comprising:
- attaching a lead wire to an underside of an electrically conductive tissue contacting plate at an attachment point;
- positioning the electrically conductive tissue contacting plate on an insulative spacer such that the attachment point is disposed within a pocket of the insulative spacer;
- routing the lead wire through a channel defined within the insulative spacer from the pocket at an upper portion of the insulative spacer, through the insulative spacer, to a bottom portion of the insulative spacer, wherein the channel has a substantially U-shaped configuration with first and second radiused corners and wherein the lead wire is routed around the first radiused corner such that an extending portion of the lead wire extends proximally from the insulative spacer first radiused corner;
- manipulating the extending portion of the lead wire to extend straight in a longitudinal direction;
- overmolding material into the pocket and a portion of the channel; and
- manipulating the extending portion of the lead wire to go around the second radiused corner.

* * * * *